United States Patent
Hokuto et al.

(10) Patent No.: US 9,719,451 B2
(45) Date of Patent: Aug. 1, 2017

(54) EXHAUST PURIFICATION SYSTEM OF INTERNAL COMBUSTION ENGINE

(71) Applicant: TOYOTA JIDOSHA KABUSHIKI KAISHA, Toyota-shi, Aichi-ken (JP)

(72) Inventors: Hiroyuki Hokuto, Numazu (JP); Koichi Hoshi, Susono (JP); Yuji Miyoshi, Susono (JP); Yuji Yamaguchi, Susono (JP); Kazuya Suzuki, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/066,469

(22) Filed: Mar. 10, 2016

(65) Prior Publication Data
US 2016/0265467 A1 Sep. 15, 2016

(30) Foreign Application Priority Data

Mar. 12, 2015 (JP) ................................ 2015-050029

(51) Int. Cl.
*F01N 3/20* (2006.01)
*F02D 41/24* (2006.01)
(Continued)

(52) U.S. Cl.
CPC ........... *F02D 41/2461* (2013.01); *F01N 3/10* (2013.01); *F01N 9/00* (2013.01); *F02D 41/008* (2013.01);
(Continued)

(58) Field of Classification Search
CPC ..... F01N 3/0864; F01N 3/0885; F01N 3/2033; F01N 2430/06; F02D 41/008;
(Continued)

(56) References Cited

U.S. PATENT DOCUMENTS 5,414,994 A 5/1995 Cullen et al.
6,622,479 B2 9/2003 Kakuyama et al.
(Continued)

FOREIGN PATENT DOCUMENTS

EP 2952716 A1 12/2015
JP 2008-223644 A 9/2008
WO 2014/118889 A1 8/2014

*Primary Examiner* — Jonathan Matthias
(74) *Attorney, Agent, or Firm* — Andrews Kurth Kenyon LLP

(57) ABSTRACT

An exhaust purification system of an internal combustion engine which has a plurality of cylinders is comprised of an exhaust purification catalyst, a downstream side air-fuel ratio sensor, and a control device which controls the average air-fuel ratio of the exhaust gas and the combustion air-fuel ratios of the cylinders. The control device performs average air-fuel ratio control where it alternately controls the average air-fuel ratio between the rich air-fuel ratio and the lean air-fuel ratio and inter-cylinder air-fuel ratio control where it controls the combustion air-fuel ratios of the cylinders so that the combustion air-fuel ratio becomes the rich air-fuel ratio at least at one cylinder among the plurality of cylinders. In average air-fuel ratio control, the average air-fuel ratio is controlled so that the lean shift amount becomes smaller than the rich shift amount when the temperature of the exhaust purification catalyst is low and the average air-fuel ratio is controlled so that the lean shift amount becomes larger than the rich shift amount when the temperature is high.

8 Claims, 19 Drawing Sheets

(51) Int. Cl.
*F02D 41/02* (2006.01)
*F02D 41/00* (2006.01)
*F01N 3/10* (2006.01)
*F01N 9/00* (2006.01)
*F02D 41/14* (2006.01)

(52) U.S. Cl.
CPC ...... *F02D 41/0085* (2013.01); *F02D 41/0295* (2013.01); *F02D 41/1454* (2013.01); *F02D 41/1475* (2013.01); *F01N 2430/06* (2013.01); *F01N 2550/02* (2013.01); *F01N 2560/025* (2013.01); *F01N 2570/04* (2013.01); *F01N 2900/1404* (2013.01); *F01N 2900/1624* (2013.01); *F02D 2200/0802* (2013.01); *F02D 2200/602* (2013.01); *Y02T 10/47* (2013.01)

(58) Field of Classification Search
CPC ............. F02D 41/0082; F02D 41/0085; F02D 41/028; F02D 41/0295; F02D 41/1475
See application file for complete search history.

(56) References Cited

U.S. PATENT DOCUMENTS

| | | |
|---|---|---|
| 7,377,104 B2 | 5/2008 | Makki et al. |
| 2004/0187479 A1 | 9/2004 | Surnilla et al. |
| 2010/0242934 A1 | 9/2010 | Yonekawa et al. |

EXHAUST PURIFICATION SYSTEM OF INTERNAL COMBUSTION ENGINE

CROSS-REFERENCE TO RELATED APPLICATION

This application claims priority based on Japanese Patent Application No. 2015-050029 filed with the Japan Patent Office on Mar. 12, 2015, the entire contents of which are incorporated into the present specification by reference.

TECHNICAL FIELD

Embodiments of the present invention relate to an exhaust purification system of an internal combustion engine.

BACKGROUND ART

Known in the past has been an exhaust purification system of an internal combustion engine which arranges an air-fuel ratio sensor or oxygen sensor at each of an upstream side and downstream side of an exhaust purification catalyst in a direction of flow of exhaust (for example, Japanese Patent Publication No. 2008-223644A and International Patent Publication No. 2014/118889A). In such an exhaust purification system, the output of the upstream side sensor is used as the basis for main feedback control of the fuel injection amount so that the air-fuel ratio of the exhaust gas which flows into the exhaust purification catalyst matches the target air-fuel ratio. In addition, the output of the downstream side sensor is used as the basis for correction of the target air-fuel ratio in the main feedback control.

In addition, in the exhaust purification system which is described in Application No. 2008-223644A, at the time of engine cold start or otherwise when the temperature of the exhaust purification catalyst is low, the air-fuel ratio of the exhaust gas which flows into the exhaust purification catalyst is made to alternately change between the rich air-fuel ratio and lean air-fuel ratio every certain time interval. According to Application No. 2008-223644A, due to this, the exhaust purification catalyst can be quickly raised in temperature.

SUMMARY

In this regard, exhaust gas which is discharged from a combustion chamber contains sulfur content. Such sulfur content is adsorbed or stored on the surface of the catalyst precious metal which is carried on the carrier of the exhaust purification catalyst under certain conditions and covers the surface of the catalyst precious metal. As a result, the catalyst precious metal falls in activity, absorption and release of oxygen become difficult, and therefore the exhaust purification catalyst falls in oxygen storage ability. Further, this invites a drop in the ability to remove unburned HC, CO, $NO_x$, etc. in the exhaust gas which flows into the exhaust purification catalyst.

As opposed to this, the assignee of the present application has proposed performing average air-fuel ratio control which alternately controls an average air-fuel ratio between a rich air-fuel ratio and a lean air-fuel ratio and inter-cylinder air-fuel ratio control which controls the combustion air-fuel ratios of the cylinders so that the combustion air-fuel ratio becomes the rich air-fuel ratio at least at one cylinder among the plurality of cylinders even if the average air-fuel ratio is controlled to the lean air-fuel ratio by the average air-fuel ratio control. In addition, in average air-fuel ratio control, it proposes to control the average air-fuel ratio so that the difference between the average air-fuel ratio and the stoichiometric air-fuel ratio when controlling the average air-fuel ratio to the lean air-fuel ratio, constituting a "lean shift amount", becomes smaller than the difference between the average air-fuel ratio and the stoichiometric air-fuel ratio when controlling the average air-fuel ratio to the rich air-fuel ratio, constituting a "rich shift amount".

In performing such average air-fuel ratio control, the time during which the average air-fuel ratio is controlled to the lean air-fuel ratio can be lengthened and therefore the drop in activity of the catalyst precious metal due to the sulfur content can be suppressed. In addition, by performing inter-cylinder air-fuel ratio control, the drop in oxygen storage ability of the exhaust purification catalyst can be suppressed.

On the other hand, to cause the sulfur content which is stored in the exhaust purification catalyst to be desorbed, the average air-fuel ratio of the exhaust gas which flows into the exhaust purification catalyst has to be made the rich air-fuel ratio. However, when performing the above-mentioned such control, the time during which the average air-fuel ratio becomes the lean air-fuel ratio becomes longer and as a result the opportunities for causing the sulfur content which is stored in the exhaust purification catalyst to be desorbed end up becoming smaller.

Therefore, in view of the above problem, an object of embodiments of the present invention is to suppress a drop in activity of a catalyst precious metal due to sulfur content and suppress a drop in oxygen storage ability of an exhaust purification catalyst while increasing the opportunities for causing the sulfur content which is stored in the exhaust purification catalyst to be desorbed.

To solve the above problem, in a first aspect of embodiments of the invention, there is provided an exhaust purification system of an internal combustion engine which has a plurality of cylinders including an exhaust purification catalyst which is arranged in an engine exhaust passage and which can store oxygen; a downstream side air-fuel ratio sensor which is arranged at a downstream side of the exhaust purification catalyst in a direction of flow of exhaust; and a control device which control an average air-fuel ratio of exhaust gas which flows into the exhaust purification catalyst and combustion air-fuel ratios when combustion is performed in the cylinders. The control device is configured to: perform average air-fuel ratio control which alternately controls the average air-fuel ratio between a rich air-fuel ratio which is richer than a stoichiometric air-fuel ratio and a lean air-fuel ratio which is leaner than the stoichiometric air-fuel ratio and perform inter-cylinder air-fuel ratio control which controls the combustion air-fuel ratios of the cylinders so that the combustion air-fuel ratio becomes the rich air-fuel ratio at least at one cylinder among the plurality of cylinders even if the average air-fuel ratio is controlled to the lean air-fuel ratio by the average air-fuel ratio control when the temperature of the exhaust purification catalyst is lower than a predetermined first switching temperature. The control is device is further configured to control the average air-fuel ratio in the average air-fuel ratio control when the temperature of the exhaust purification catalyst is lower than a predetermined second switching temperature, so that a lean shift amount of a difference between the average air-fuel ratio and stoichiometric air-fuel ratio when controlling the average air-fuel ratio to a lean air-fuel ratio becomes smaller than a rich shift amount of a difference between the average air-fuel ratio and stoichiometric air-fuel ratio when controlling the average air-fuel ratio to a rich air-fuel ratio, and control the average air-fuel ratio in the average air-fuel ratio control when the temperature of the exhaust purification catalyst is the second switching temperature or more, so that the lean shift amount becomes larger than the rich shift amount.

In a second aspect of the invention, there is provided the first aspect above, wherein the control device is further configured to perform the inter-cylinder air-fuel ratio control even when the temperature of the exhaust purification catalyst is the first switching temperature or more.

In a third aspect of the invention, there is provided the first aspect above, wherein the control device is further configured to control the combustion air-fuel ratios of the cylinders without performing the inter-cylinder air-fuel ratio control when the temperature of the exhaust purification catalyst is higher than a predetermined upper limit temperature, so that the combustion air-fuel ratios become equal at all of the cylinders, and wherein the upper limit temperature being made a temperature higher than the first switching temperature.

In a fourth aspect of the invention, there is provided the first aspect above, wherein the control device is further configured to control the combustion air-fuel ratios of the cylinders without performing the inter-cylinder air-fuel ratio control when the temperature of the exhaust purification catalyst is the first switching temperature or more, so that the combustion air-fuel ratios become equal at all of the cylinders.

In a fifth aspect of the invention, there is provided the first aspect above, wherein the control device is further configured to control the combustion air-fuel ratios of the cylinders in the inter-cylinder air-fuel ratio control even when the average air-fuel ratio is controlled to the rich air-fuel ratio by the average air-fuel ratio control, so that the combustion air-fuel ratio becomes the lean air-fuel ratio at least at one cylinder among the plurality of cylinders.

In a sixth aspect of the invention, there is provided the first aspect above, wherein the control device is further configured to control the combustion air-fuel ratios of the cylinders without performing the inter-cylinder air-fuel ratio control when the average air-fuel ratio is controlled to the rich air-fuel ratio, so that the combustion air-fuel ratios become the rich air-fuel ratio at all of the plurality of cylinders.

In a seventh aspect of the invention, there is provided the first aspect above, wherein the control device is further configured to: switch the average air-fuel ratio to a lean air-fuel ratio in the average air-fuel ratio control when controlling the average air-fuel ratio to a rich air-fuel ratio and an output air-fuel ratio of the downstream side air-fuel ratio sensor becomes a rich judged air-fuel ratio which is richer than the stoichiometric air-fuel ratio or becomes less; and switch the average air-fuel ratio to a rich air-fuel ratio in the average air-fuel ratio control when controlling the average air-fuel ratio to a lean air-fuel ratio and an output air-fuel ratio of the downstream side air-fuel ratio sensor becomes a lean judged air-fuel ratio which is leaner than the stoichiometric air-fuel ratio or becomes more.

In an eighth aspect of the invention, there is provided the first aspect above, wherein the control device is further configured to: switch the air-fuel ratio to a lean air-fuel ratio in the average air-fuel ratio control when controlling the average air-fuel ratio to a rich air-fuel ratio and an output air-fuel ratio of the downstream side air-fuel ratio sensor becomes a rich judged air-fuel ratio which is richer than the stoichiometric air-fuel ratio or becomes less; and switch the average air-fuel ratio to a rich air-fuel ratio in the average air-fuel ratio control when the oxygen storage amount of the exhaust purification catalyst from when starting to control the average air-fuel ratio to a lean air-fuel ratio reaches a predetermined the switching reference storage amount which is less than the maximum storable oxygen amount of the exhaust purification catalyst.

According to embodiments of the present invention, it is possible to suppress a drop in activity of a catalyst precious metal due to sulfur content and suppress a drop in oxygen storage ability of an exhaust purification catalyst while increasing the opportunities for causing the sulfur content which is stored in the exhaust purification catalyst to be desorbed.

DESCRIPTION OF EMBODIMENTS

Figure 1:
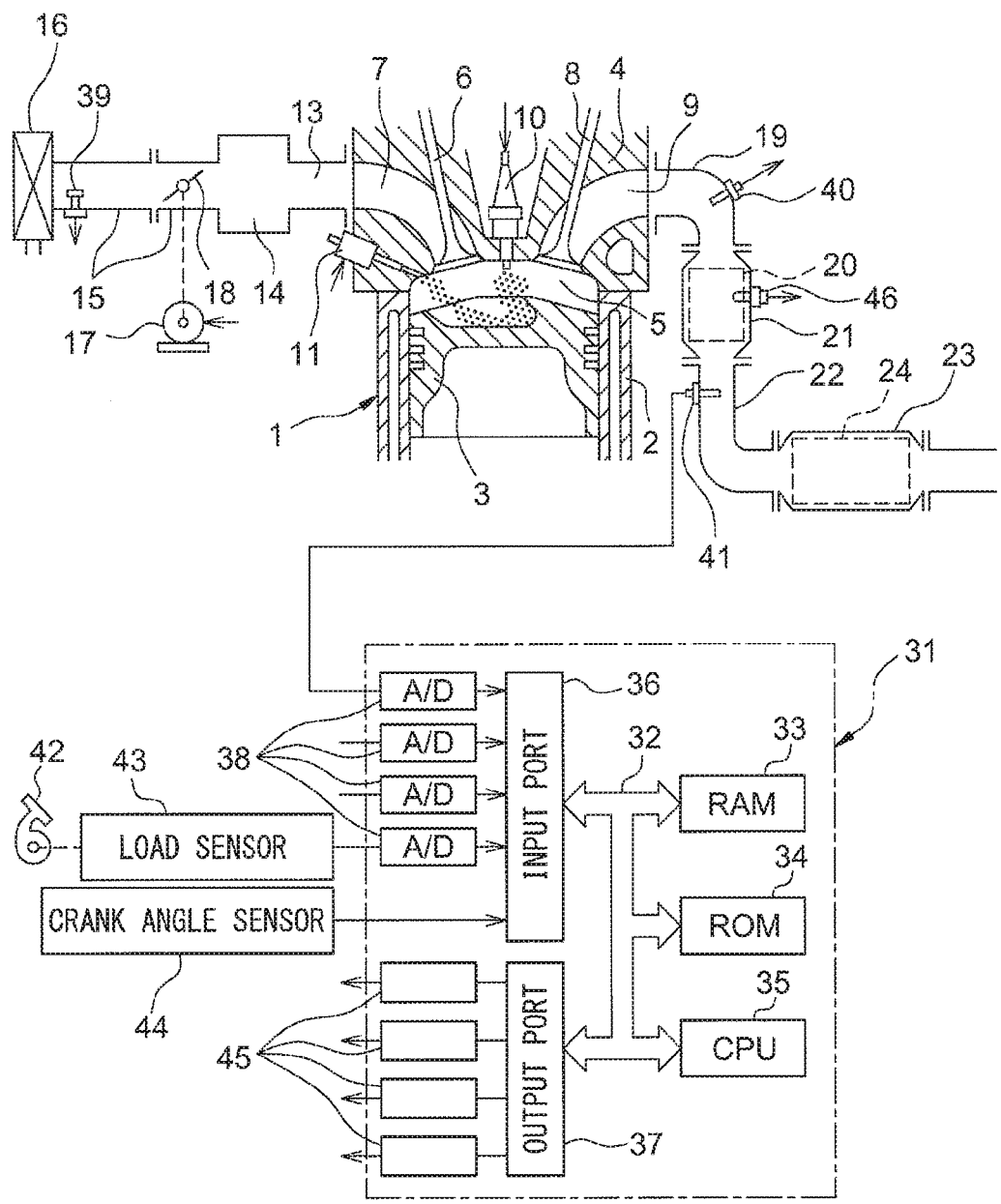
FIG. 1 is a view which schematically shows an internal combustion engine in which a control device of the present invention is used.

Below, referring to the drawings, embodiments of the present invention will be explained in detail. Note that, in the following explanation, similar components are assigned the same reference numerals.

<Explanation of Internal Combustion Engine as a Whole>

FIG. 1 is a view which schematically shows an internal combustion engine in which a control device according to the present invention is used. Referring to FIG. 1, 1 indicates an engine body, 2 indicates a cylinder block, 3 indicates a piston which reciprocates in the cylinder block 2, 4 indicates a cylinder head which is fastened to the cylinder block 2, 5 indicates a combustion chamber which is formed between the piston 3 and the cylinder head 4, 6 indicates an intake valve, 7 indicates an intake port, 8 indicates an exhaust valve, and 9 indicates an exhaust port. The intake valve 6 opens and closes the intake port 7, while the exhaust valve 8 opens and closes the exhaust port 9. The internal combustion engine according to the present embodiment is an in-line four cylinder internal combustion engine. Therefore, the engine body 1 comprises four combustion chambers 5. However, the internal combustion engine is not limited this constitution as long as the internal combustion engine which has a plurality of cylinders. For example, the internal combustion engine may be other type internal combustion engines such as a six cylinder internal combustion engine or a V-type internal combustion engine.

As shown in FIG. 1, a spark plug 10 is arranged at a center part of an inside wall surface of the cylinder head 4, while a fuel injector 11 is arranged at a peripheral part of the inner wall surface of the cylinder head 4. The spark plug 10 is configured to generate a spark in accordance with an ignition signal. Further, the fuel injector 11 injects a predetermined amount of fuel into the combustion chamber 5 in accordance with an injection signal. Note that, the fuel injector 11 may also be arranged so as to inject fuel into the intake port 7. Further, in the present embodiment, as the fuel, gasoline with a stoichiometric air-fuel ratio of 14.6 is used. However, the internal combustion engine of the present embodiment may also use another kind of fuel.

The intake port 7 of each cylinder is connected to a surge tank 14 through a corresponding intake runner 13, while the surge tank 14 is connected to an air cleaner 16 through an intake pipe 15. The intake port 7, intake runner 13, surge tank 14, and intake pipe 15 form an intake passage. Further, inside the intake pipe 15, a throttle valve 18 which is driven by a throttle valve drive actuator 17 is arranged. The throttle valve 18 can be operated by the throttle valve drive actuator 17 to thereby change the aperture area of the intake passage.

On the other hand, the exhaust port 9 of each cylinder is connected to an exhaust manifold 19. The exhaust manifold 19 has a plurality of runners which are connected to the exhaust ports 9 and a collected part at which these runners are collected. The collected part of the exhaust manifold 19 is connected to an upstream side casing 21 which houses an upstream side exhaust purification catalyst 20. The upstream side casing 21 is connected through an exhaust pipe 22 to a downstream side casing 23 which houses a downstream side exhaust purification catalyst 24. The exhaust port 9, exhaust manifold 19, upstream side casing 21, exhaust pipe 22, and downstream side casing 23 form an exhaust passage.

The electronic control unit (ECU) 31 is comprised of a digital computer which is provided with components which are connected together through a bidirectional bus 32 such as a RAM (random access memory) 33, ROM (read only memory) 34, CPU (microprocessor) 35, input port 36, and output port 37. In the intake pipe 15, an airflow meter 39 is arranged for detecting the flow rate of air flowing through the intake pipe 15. The output of this airflow meter 39 is input through a corresponding AD converter 38 to the input port 36. Further, at the collected part of the exhaust manifold 19, an upstream side air-fuel ratio sensor 40 is arranged which detects the air-fuel ratio of the exhaust gas flowing through the inside of the exhaust manifold 19 (that is, the exhaust gas flowing into the upstream side exhaust purification catalyst 20). In addition, in the exhaust pipe 22, a downstream side air-fuel ratio sensor 41 is arranged which detects the air-fuel ratio of the exhaust gas flowing through the inside of the exhaust pipe 22 (that is, the exhaust gas flowing out from the upstream side exhaust purification catalyst 20 and flowing into the downstream side exhaust purification catalyst 24). The outputs of these air-fuel ratio sensors 40 and 41 are also input through the corresponding AD converters 38 to the input port 36. In addition, at the upstream side exhaust purification catalyst 20, a temperature sensor 46 is arranged which detects the temperature of the upstream side exhaust purification catalyst 20. The output of this temperature sensor 46 is also input through a corresponding AD converter 38 to the input port 36.

Further, an accelerator pedal 42 is connected to a load sensor 43 generating an output voltage which is proportional to the amount of depression of the accelerator pedal 42. The output voltage of the load sensor 43 is input to the input port 36 through a corresponding AD converter 38. The crank angle sensor 44 generates an output pulse every time, for example, a crankshaft rotates by 15 degrees. This output pulse is input to the input port 36. The CPU 35 calculates the engine speed from the output pulse of this crank angle sensor 44. On the other hand, the output port 37 is connected through corresponding drive circuits 45 to the spark plugs 10, fuel injectors 11, and throttle valve drive actuator 17. Note that the ECU 31 functions as a control device for controlling the internal combustion engine and the exhaust purification system.

Note that, the internal combustion engine according to the present embodiment is a non-supercharged internal combustion engine which is fueled by gasoline, but the internal combustion engine according to the present invention is not limited to the above configuration. For example, the internal combustion engine according to the present invention may have cylinder array, type of fuel injection, configuration of intake and exhaust systems, configuration of valve mechanism, presence of supercharger, and/or supercharged state, etc. which are different from the above internal combustion engine.

<Explanation of Exhaust Purification Catalysts>

The upstream side exhaust purification catalyst 20 and downstream side exhaust purification catalyst 24 both have similar configurations. The exhaust purification catalysts 20 and 24 are three-way catalysts which have oxygen storage abilities. Specifically, the exhaust purification catalysts 20 and 24 are three-way catalysts comprised of carriers made of ceramics on which precious metals which have catalytic actions (for example, platinum (Pt)) and substances which have oxygen storage abilities (for example, ceria ($CeO_2$), below, also referred to as "oxygen storing substances") are carried. Three-way catalysts have the functions of simultaneously removing unburned HC, CO, and $NO_x$ if the air-fuel ratio of the exhaust gas which flows into the three-way catalysts is maintained at the stoichiometric air-fuel ratio. In addition, when the exhaust purification catalysts 20 and 24 have oxygen storage abilities, unburned HC, CO, and $NO_x$ are simultaneously removed even if the air-fuel ratio of the exhaust gas which flows into the exhaust purification catalysts 20 and 24 deviates somewhat to the rich side or lean side from the stoichiometric air-fuel ratio.

That is, since such three-way catalysts have oxygen storage abilities, they stores excess oxygen which is contained in exhaust gas when the air-fuel ratio of the exhaust gas which flows into the exhaust purification catalysts 20 and 24 becomes an air-fuel ratio leaner than the stoichiometric air-fuel ratio (below, simply referred to as the "lean air-fuel ratio"). Due to this, the surfaces of the exhaust purification catalysts 20 and 24 are maintained at the stoichiometric air-fuel ratio and unburned HC, CO, and $NO_x$ are simultaneously removed at the surfaces of the exhaust purification catalysts 20 and 24. At this time, the air-fuel ratio of the exhaust gas which is discharged from the exhaust purification catalysts 20 and 24 becomes the stoichiometric air-fuel ratio. However, three-way catalysts can no longer store any further oxygen if the oxygen storage amounts reach the maximum value of the storable oxygen amount, that is, the maximum storable oxygen amount Cmax. Therefore, if, in the state where the oxygen storage amounts of the three-way catalyst reach substantially the maximum storable oxygen amount Cmax, the air-fuel ratio of the exhaust gas which flows into the exhaust purification catalysts 20 and 24 becomes the lean air-fuel ratio, the exhaust purification catalysts 20 and 24 soon can no longer be maintained at the stoichiometric air-fuel ratio on their surfaces. For this reason, in this case, the air-fuel ratio of the exhaust gas which is discharged from the exhaust purification catalysts 20 and 24 becomes the lean air-fuel ratio.

On the other hand, in such three-way catalysts, when the air-fuel ratio of the exhaust gas which flows into the exhaust purification catalysts 20 and 24 becomes an air-fuel ratio richer than the stoichiometric air-fuel ratio (below, simply referred to as the "rich air-fuel ratio"), oxygen which is insufficient for reducing the unburned HC, CO which are contained in the exhaust gas is released from the exhaust purification catalysts 20 and 24. In this case as well, the surfaces of the exhaust purification catalysts 20 and 24 are maintained at the stoichiometric air-fuel ratio and the unburned HC, CO, and $NO_x$ are simultaneously removed at the surfaces of the exhaust purification catalysts 20 and 24. At this time, the air-fuel ratio of the exhaust gas which is discharged from the exhaust purification catalysts 20 and 24 becomes a stoichiometric air-fuel ratio. However, the three-way catalysts can no longer release any further oxygen if the oxygen storage amounts reach zero. Therefore, if, in the state where the oxygen storage amounts of the three-way catalysts reach substantially zero, the air-fuel ratio of the exhaust gas which flows into the exhaust purification catalysts 20 and 24 becomes the rich air-fuel ratio, the exhaust purification catalysts 20 and 24 soon can no longer maintain their surfaces at the stoichiometric air-fuel ratio. For this reason, in this case, the air-fuel ratio of the exhaust gas which is discharged from the exhaust purification catalysts 20 and 24 becomes a rich air-fuel ratio.

In the above way, according to the exhaust purification catalysts 20 and 24 which are used in the present embodiment, the characteristics of removal of the unburned HC, CO, and $NO_x$ in the exhaust gas changes according to the air-fuel ratio of the exhaust gas which flows into the exhaust purification catalysts 20 and 24 and the oxygen storage amounts.

<Output Characteristic of Air-Fuel Ratio Sensor>

Figure 2:
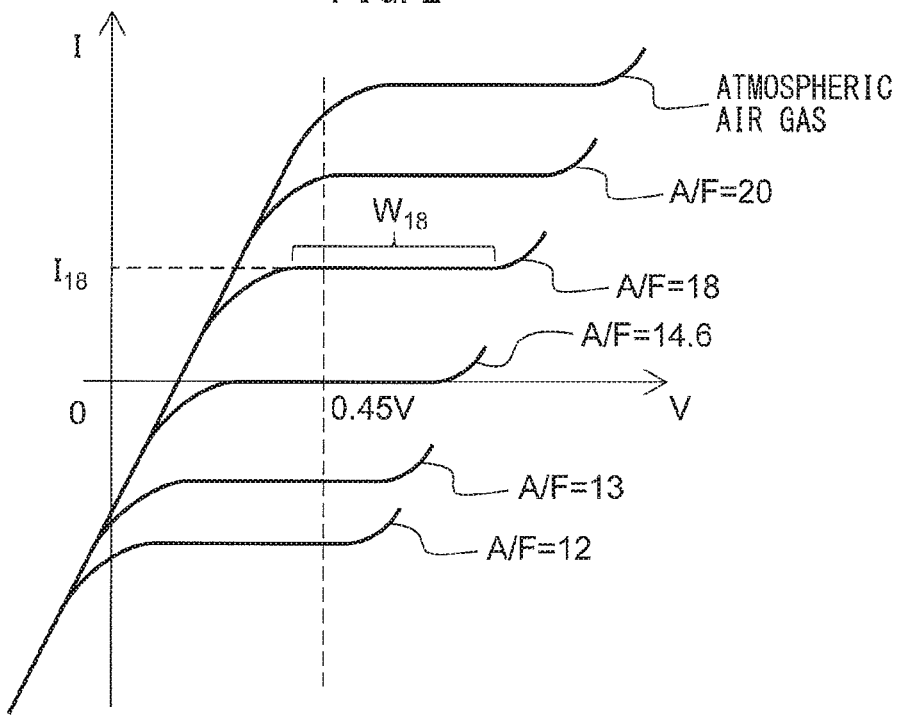
FIG. 2 is a view which shows the relationship between a sensor applied voltage and output current at each exhaust air-fuel ratio.
Figure 3:
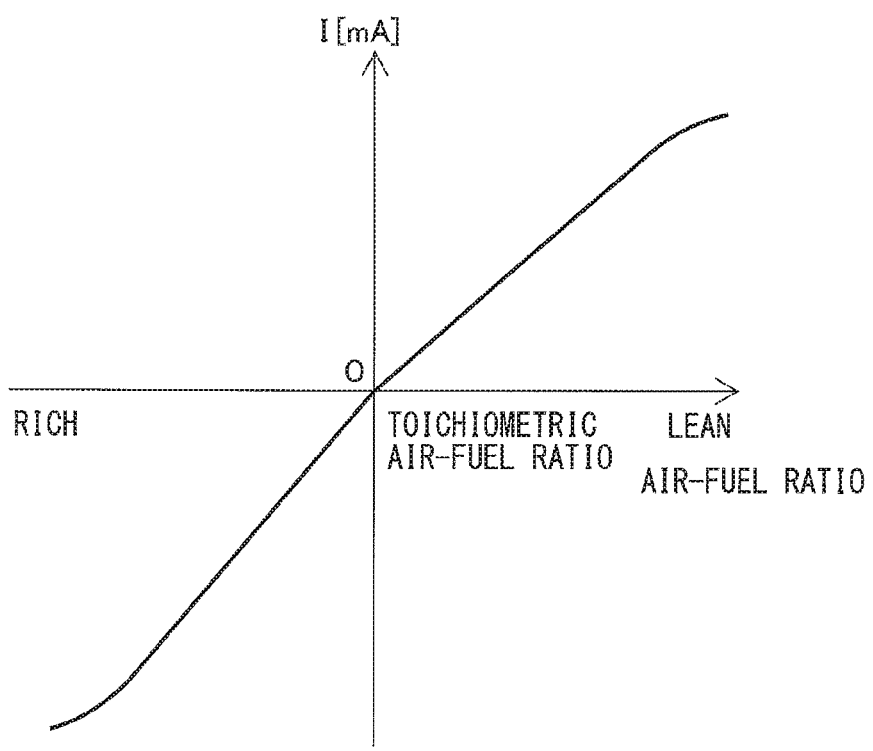
FIG. 3 is a view which shows the relationship of an exhaust air-fuel ratio and output current when making the sensor applied voltage constant.

Next, referring to FIGS. 2 and 3, the output characteristic of air-fuel ratio sensors 40 and 41 in the present embodiment will be explained. FIG. 2 is a view showing the voltage-current (V-I) characteristic of the air-fuel ratio sensors 40 and 41 of the present embodiment. FIG. 3 is a view showing the relationship between air-fuel ratio of the exhaust gas (below, referred to as "exhaust air-fuel ratio") flowing around the air-fuel ratio sensors 40 and 41 and output current I, when making the supplied voltage constant. Note that, in this embodiment, the air-fuel ratio sensor having the same configurations is used as both air-fuel ratio sensors 40 and 41.

As will be understood from FIG. 2, in the air-fuel ratio sensors 40 and 41 of the present embodiment, the output current I becomes larger the higher (the leaner) the exhaust air-fuel ratio. Further, the line V-I of each exhaust air-fuel ratio has a region substantially parallel to the V axis, that is, a region where the output current does not change much at all even if the supplied voltage of the sensor changes. This voltage region is called the "limit current region". The current at this time is called the "limit current". In FIG. 2, the limit current region and limit current when the exhaust air-fuel ratio is 18 are shown by $W_{13}$ and $I_{18}$, respectively. Therefore, the air-fuel ratio sensors 40 and 41 can be referred to as "limit current type air-fuel ratio sensors".

FIG. 3 is a view which shows the relationship between the exhaust air-fuel ratio and the output current I when making the supplied voltage constant at about 0.45V. As will be understood from FIG. 3, in the air-fuel ratio sensors 40 and 41, the output current I varies linearly (proportionally) with respect to the exhaust air-fuel ratio such that the higher (that is, the leaner) the exhaust air-fuel ratio, the greater the output current I from the air-fuel ratio sensors 40 and 41. In addition, the air-fuel ratio sensors 40 and 41 are configured so that the output current I becomes zero when the exhaust air-fuel ratio is the stoichiometric air-fuel ratio. Further, when the exhaust air-fuel ratio becomes larger by a certain extent or more or when it becomes smaller by a certain extent or more, the ratio of change of the output current to the change of the exhaust air-fuel ratio becomes smaller.

Note that, in the above example, as the air-fuel ratio sensors 40 and 41, limit current type air-fuel ratio sensors are used. However, as the air-fuel ratio sensors 40 and 41, it is also possible to use air-fuel ratio sensor not a limit current type or any other air-fuel ratio sensor, as long as the output current varies linearly with respect to the exhaust air-fuel ratio. Further, the air-fuel ratio sensors 40 and 41 may have structures different from each other. In addition, as the downstream side air-fuel ratio sensor 41, it is also possible to use a sensor where the output current does not change linearly with respect to the exhaust air-fuel ratio. Specifically, as the downstream side air-fuel ratio sensor 41, for example, it is also possible to use an oxygen sensor with an output value which greatly changes near the stoichiometric air-fuel ratio etc.

<Summary of Air-Fuel Ratio Control>

Next, a summary of the air-fuel ratio control in the exhaust purification system of the present embodiment will be given. In the present embodiment, the output air-fuel ratio of the upstream side air-fuel ratio sensor 40 is used as the basis for feedback control which controls the amounts of fuel injection from the fuel injectors 11 so that the output air-fuel ratio of the upstream side air-fuel ratio sensor 40 matches the target air-fuel ratio. Note that, "the output air-fuel ratio" means the air-fuel ratio corresponding to the output value of the air-fuel ratio sensor.

Here, as explained later, in the present embodiment, sometimes the fuel injection amounts from the fuel injectors 11 are made amounts differing between cylinders. In this case, the output air-fuel ratio of the upstream side air-fuel ratio sensor 40 fluctuates somewhat during one cycle. In such a case as well, in the present embodiment, the fuel injection amounts from the fuel injectors are controlled so that the average value of the output air-fuel ratio of the upstream side air-fuel ratio sensor 40 (below, referred to as the "average output air-fuel ratio") matches the average value of the target air-fuel ratios which differ between cylinders, that is, the target average air-fuel ratio.

In addition, in the air-fuel ratio control of the present embodiment, average air-fuel ratio control and inter-cylinder air-fuel ratio control (dither control) are performed. Average air-fuel ratio control is control which uses the output air-fuel ratio of the downstream side air-fuel ratio sensor 41 as the basis to set the target average air-fuel ratio. Therefore, the average air-fuel ratio control can be said to control the average value for all cylinders of the air-fuel ratios of the air-fuel mixtures when combustion is performed at the cylinders (below, referred to as "combustion air-fuel ratio", corresponding to air-fuel ratio of air-fuel mixture which is fed to each cylinder) (value of total of combustion air-fuel ratios of cylinders in one cycle divided by number of cylinders), that is, the average combustion air-fuel ratio. In other words, it can be said that the average exhaust air-fuel ratio of the exhaust gas which flows into the upstream side exhaust purification catalyst 20 is controlled. On the other hand, the inter-cylinder air-fuel ratio control is control which sets a different target air-fuel ratio for each cylinder. In other words, it controls the combustion air-fuel ratio at each cylinder.

<Average Air-Fuel Ratio Control>

First, average air-fuel ratio control will be explained. In average air-fuel ratio control, first, if, in the state where the target average air-fuel ratio is set to the later explained rich set air-fuel ratio, it is judged that the output air-fuel ratio of the downstream side air-fuel ratio sensor 41 has become the rich air-fuel ratio, the target average air-fuel ratio is switched to the lean set air-fuel ratio. Due to this, the average combustion air-fuel ratio and average exhaust air-fuel ratio (below, these will be referred to all together as the "average air-fuel ratio") change to the lean set air-fuel ratio. Here, in the present embodiment, when the output air-fuel ratio of the downstream side air-fuel ratio sensor 41 becomes a rich judged air-fuel ratio which is slightly richer than the stoichiometric air-fuel ratio (for example, 14.55) or becomes less, it is judged that the output air-fuel ratio of the downstream side air-fuel ratio sensor 41 has become the rich air-fuel ratio. Therefore, in average air-fuel ratio control, when the average air-fuel ratio is controlled to the rich air-fuel ratio, the average air-fuel ratio is switched to the lean air-fuel ratio when the output air-fuel ratio of the downstream side air-fuel ratio sensor 41 becomes the rich judged air-fuel ratio or less. Further, the lean set air-fuel ratio is made a predetermined air-fuel ratio which is slightly leaner than the stoichiometric air-fuel ratio (air-fuel ratio becoming control center), for example, 14.7 or so.

On the other hand, in average air-fuel ratio control, if, in the state where the target average air-fuel ratio is set to the lean set air-fuel ratio, it is judged that the output air-fuel ratio of the downstream side air-fuel ratio sensor 41 has become the lean air-fuel ratio, the target average air-fuel ratio is switched to the rich set air-fuel ratio. Due to this, the average air-fuel ratio changes to the rich set air-fuel ratio. Here, in the present embodiment, when the output air-fuel ratio of the downstream side air-fuel ratio sensor 41 becomes a lean judged air-fuel ratio (for example, 14.65) which is slightly leaner than the stoichiometric air-fuel ratio or becomes more, it is judged that the output air-fuel ratio of the downstream side air-fuel ratio sensor 41 has become the lean air-fuel ratio. Therefore, in average air-fuel ratio control, when controlling the average air-fuel ratio to the lean air-fuel ratio, the average air-fuel ratio is switched to the rich air-fuel ratio when the output air-fuel ratio of the downstream side air-fuel ratio sensor 41 becomes the lean judged air-fuel ratio or more. Further, the rich set air-fuel ratio is made a predetermined air-fuel ratio which is richer to a certain extent than the stoichiometric air-fuel ratio (air-fuel ratio becoming control center), for example, 14.4 or so. Note that, the difference between the lean set air-fuel ratio and the stoichiometric air-fuel ratio (below, also referred to as the "lean shift amount") is smaller than the difference between the rich set air-fuel ratio and the stoichiometric air-fuel ratio (below, also referred to as the "rich shift amount").

As a result, in average air-fuel ratio control, the target average air-fuel ratio is alternately set to the rich air-fuel ratio and the lean air-fuel ratio. Due to this, the average air-fuel ratio of the exhaust gas which flows into the upstream side exhaust purification catalyst 20 is alternately controlled to the rich air-fuel ratio and the lean air-fuel ratio.

Note that, the rich judged air-fuel ratio and lean judged air-fuel ratio are made air-fuel ratios within 1% of the stoichiometric air-fuel ratio, preferably within 0.5%, more preferably within 0.35%. Therefore, the differences of the rich judged air-fuel ratio and lean judged air-fuel ratio from the stoichiometric air-fuel ratio when the stoichiometric air-fuel ratio is 14.6 are made 0.15 or less, preferably 0.073 or less, more preferably 0.051 or less. Further, the set air-fuel ratio at the target average air-fuel ratio (for example, rich set air-fuel ratio or lean set air-fuel ratio) is set so that the difference from the stoichiometric air-fuel ratio becomes larger than the above-mentioned difference.

Figure 4:
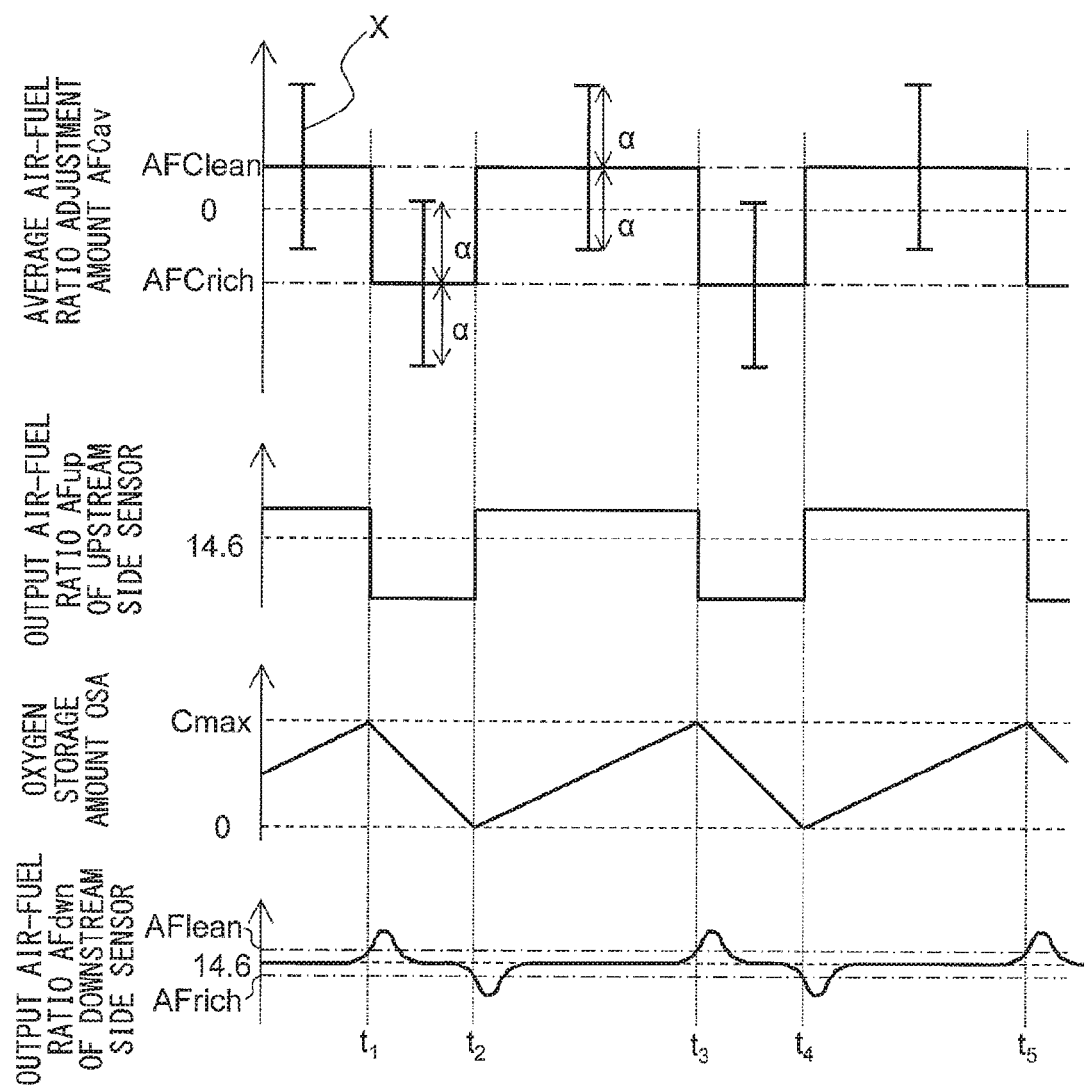
FIG. 4 is a time chart of an average air-fuel ratio correction amount etc. in the case of performing air-fuel ratio control by the exhaust purification system according to the present embodiment.

Referring to FIG. 4, the average air-fuel ratio control will be specifically explained. FIG. 4 is a time chart of the average air-fuel ratio correction amount AFCav, output air-fuel ratio AFup of the upstream side air-fuel ratio sensor 40, oxygen storage amount OSA of the upstream side exhaust purification catalyst 20, and output air-fuel ratio AFdwn of the downstream side air-fuel ratio sensor 41 when performing air-fuel ratio control according to an exhaust purification system according to the present embodiment.

Note that, the average air-fuel ratio correction amount AFCav is a correction amount which corresponds to the target average air-fuel ratio of the exhaust gas which flows into the upstream side exhaust purification catalyst 20. When the average air-fuel ratio correction amount AFCav is 0, it means that the target average air-fuel ratio is an air-fuel ratio equal to the air-fuel ratio becoming the control center (below, referred to as the "control center air-fuel ratio") (in the present embodiment, basically stoichiometric air-fuel ratio). Further, when the average air-fuel ratio correction amount AFCav is a positive value, it means that the target average air-fuel ratio is an air-fuel ratio leaner than the control center air-fuel ratio (in the present embodiment, lean air-fuel ratio). Further, the absolute value of the average air-fuel ratio correction amount AFCav at this time corresponds to the difference of the target average air-fuel ratio and the control center air-fuel ratio or the difference between the average air-fuel ratio and the control center air-fuel ratio, constituting the "lean shift amount". Note that, "control center air-fuel ratio" means the air-fuel ratio to which the average air-fuel ratio correction amount AFCav is added according to the engine operating state, that is, the air-fuel ratio which becomes the reference when changing the target average air-fuel ratio in accordance with the average air-fuel ratio correction amount AFCay.

Similarly, when the average air-fuel ratio correction amount AFCav is a negative value, it means the target average air-fuel ratio is an air-fuel ratio which is richer than the control center air-fuel ratio (in the present embodiment, rich air-fuel ratio). Further, the absolute value of the average air-fuel ratio correction amount AFCav at this time corresponds to the difference of the target average air-fuel ratio and the control center air-fuel ratio or the difference between the average air-fuel ratio and the control center air-fuel ratio, constituting the "rich shift amount".

In the example which is shown in FIG. 4, in the state before the time $t_1$, the average air-fuel ratio correction amount AFCav is set to the lean set correction amount AFClean (corresponding to lean set air-fuel ratio). That is, the target average air-fuel ratio is made the lean air-fuel ratio. Along with this, the output air-fuel ratio AFup of the upstream side air-fuel ratio sensor 40, that is, the air-fuel ratio of the exhaust gas which flows into the upstream side exhaust purification catalyst 20, becomes a lean air-fuel ratio. The excess oxygen which is contained in the exhaust gas which flows into the upstream side exhaust purification catalyst 20 is stored in the upstream side exhaust purification catalyst 20. Along with this, the oxygen storage amount OSA of the upstream side exhaust purification catalyst 20 gradually increases. On the other hand, the upstream side exhaust purification catalyst 20 stores the oxygen, therefore the exhaust gas which flows out from the upstream side exhaust purification catalyst 20 does not contain oxygen, therefore the output air-fuel ratio AFdwn of the downstream side air-fuel ratio sensor 41 becomes substantially the stoichiometric air-fuel ratio.

If the oxygen storage amount OSA of the upstream side exhaust purification catalyst 20 gradually increases, finally, the oxygen storage amount OSA approaches the maximum storable oxygen amount Cmax. Along with this, part of the oxygen which flows into the upstream side exhaust purification catalyst 20 starts to flow out without being stored at the upstream side exhaust purification catalyst 20. Due to this, the output air-fuel ratio AFdwn of the downstream side air-fuel ratio sensor 41 gradually rises. At the time $t_1$, it reaches the lean judged air-fuel ratio AFlean.

In the present embodiment, if the output air-fuel ratio AFdwn of the downstream side air-fuel ratio sensor 41 becomes the lean judged air-fuel ratio AFlean or more, the oxygen storage amount OSA is made to decrease by switching the average air-fuel ratio correction amount AFCav to the rich set correction amount AFCrich (corresponding to rich set air-fuel ratio). Therefore, the target average air-fuel ratio is switched to the rich air-fuel ratio.

Note that, in the present embodiment, rather than right after the output air-fuel ratio AFdwn of the downstream side air-fuel ratio sensor 41 changes from the stoichiometric air-fuel ratio to the rich air-fuel ratio, the average air-fuel ratio correction amount AFCav is switched after the rich judged air-fuel ratio AFrich is reached. This is because even if the oxygen storage amount OSA of the upstream side exhaust purification catalyst 20 is sufficient, the air-fuel ratio of the exhaust gas which flows out from the upstream side exhaust purification catalyst 20 sometimes ends up deviating very slightly from the stoichiometric air-fuel ratio. Conversely speaking, the rich judged air-fuel ratio is made an air-fuel ratio which the air-fuel ratio of the exhaust gas which flows out from the upstream side exhaust purification catalyst 20 does not usually reach when the oxygen storage amount OSA of the upstream side exhaust purification catalyst 20 is sufficient. Note that, the same can be said for the above-mentioned lean judged air-fuel ratio.

If, at the time $t_1$, the target average air-fuel ratio is switched to the rich air-fuel ratio, along with this, the output air-fuel ratio AFup of the upstream side air-fuel ratio sensor 40, that is, the average air-fuel ratio, changes to the rich air-fuel ratio. The excess unburned HC and CO which is contained in the exhaust gas which flows into the upstream side exhaust purification catalyst 20 are removed at the upstream side exhaust purification catalyst 20. Along with this, the oxygen storage amount OSA of the upstream side exhaust purification catalyst 20 gradually decreases. On the other hand, the upstream side exhaust purification catalyst 20 removes the unburned HC and CO, therefore the exhaust gas which flows out from the upstream side exhaust purification catalyst 20 does not contain unburned HC and CO, therefore the output air-fuel ratio AFdwn of the downstream side air-fuel ratio sensor 41 becomes substantially the stoichiometric air-fuel ratio.

If the oxygen storage amount OSA of the upstream side exhaust purification catalyst 20 gradually decreases, finally the oxygen storage amount OSA approaches zero. Along with this, part of the unburned HC and CO which flows into the upstream side exhaust purification catalyst 20 starts to flow out without being removed at the upstream side exhaust purification catalyst 20. Due to this, the output air-fuel ratio AFdwn of the downstream side air-fuel ratio sensor 41 gradually falls. At the time $t_2$, it reaches the rich judged air-fuel ratio AFrich.

In the present embodiment, if the output air-fuel ratio AFdwn of the downstream side air-fuel ratio sensor 41 becomes the rich judged air-fuel ratio AFrich or less, to make the oxygen storage amount OSA increase, the average air-fuel ratio correction amount AFCav is switched to the lean set correction amount AFClean. Therefore, the target air-fuel ratio is switched to the lean air-fuel ratio. After that, at the time $t_3$ on, an operation similar to the above-mentioned operation is repeated.

Further, in the average air-fuel ratio control which is shown in FIG. 4, the absolute value of the lean set correction amount AFClean is made a value smaller than the absolute value of the rich set correction amount AFCrich. Therefore, the difference between the average air-fuel ratio and control center air-fuel ratio (stoichiometric air-fuel ratio) when controlling the average air-fuel ratio to the lean air-fuel ratio, constituting the "lean shift amount", is made smaller than the difference between the average air-fuel ratio and control center air-fuel ratio when controlling the average air-fuel ratio to the rich air-fuel ratio, constituting the "rich shift amount". Due to this, the time period in which the target average air-fuel ratio is set to the lean set correction amount AFClean (for example, times $t_2$ to $t_3$) is made longer than the time period in which the target air-fuel ratio is set to the rich set correction amount AFCrich (for example, times $t_1$ to $t_2$).

<Inter-Cylinder Air-Fuel Ratio Control>

Next, inter-cylinder air-fuel ratio control will be explained. In inter-cylinder air-fuel ratio control, the fuel injection amounts from the fuel injectors 11 are controlled so that the combustion air-fuel ratios becomes different air-fuel ratios at least partially between the cylinders. In particular, in the present embodiment, in part of the cylinders, the combustion air-fuel ratio is made richer than the target average air-fuel ratio, while at the remaining cylinders, the combustion air-fuel ratio is made leaner than the target air-fuel ratio.

Figure 5:
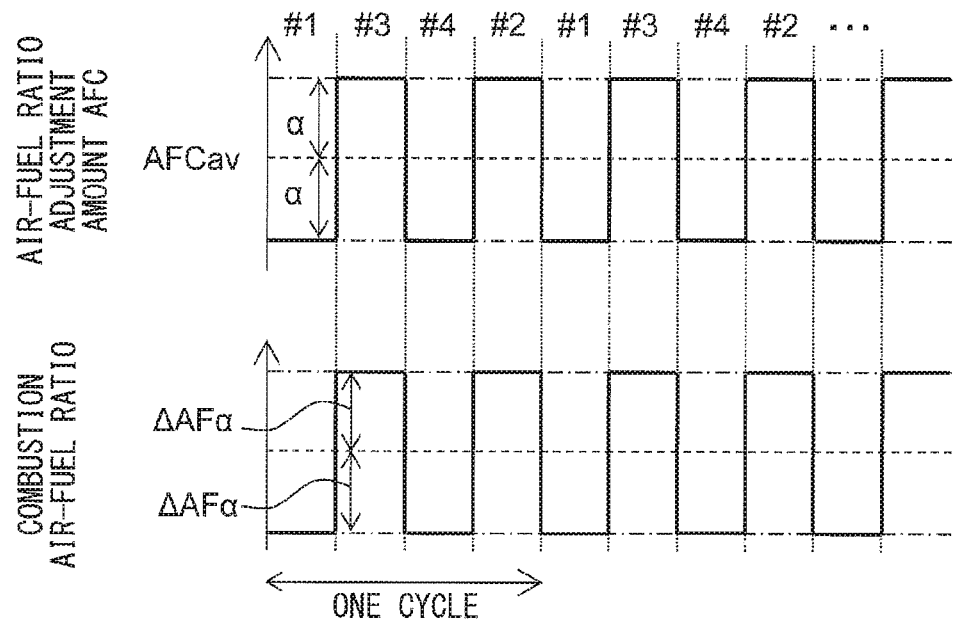
FIG. 5 is a time chart of an air-fuel ratio correction amount and combustion air-fuel ratio.

FIG. 5 is a time chart of the air-fuel ratio correction amount AFC and combustion air-fuel ratios of the cylinders. In the present embodiment, the internal combustion engine is an in-line four-cylinder internal combustion engine, therefore the air-fuel mixture is burned in the combustion chambers 5 in the order of the #1 cylinder, #3 cylinder, #4 cylinder, and #2 cylinder. In the example which is shown in FIG. 5, in the #1 cylinder where combustion is first performed in one cycle, the air-fuel ratio correction amount AFC in the cylinder is decreased by the average air-fuel ratio correction amount AFCay. That is, in the #1 cylinder, the air-fuel ratio of the air-fuel mixture which is fed to the combustion chamber 5 is made richer than the average target air-fuel ratio. Therefore, in the #1 cylinder, the combustion air-fuel ratio is made an air-fuel ratio richer than the average air-fuel ratio.

Further, at the #3 cylinder at which combustion is next performed, the air-fuel ratio correction amount AFC of the cylinder is increased by the average air-fuel ratio correction amount AFCay. As a result, at the #3 cylinder, the combustion air-fuel ratio is made an air-fuel ratio leaner than the average air-fuel ratio. Further, at the #4 cylinder at which combustion is next performed, the combustion air-fuel ratio is made an air-fuel ratio richer than the average air-fuel ratio, while at the #2 cylinder at which combustion is next performed, the combustion air-fuel ratio is made an air-fuel ratio which is leaner than the average air-fuel ratio.

Further, in the present embodiment, the amounts of change from the average air-fuel ratio correction amount AFCav in the inter-cylinder air-fuel ratio control are made the same between cylinders made richer than the average air-fuel ratio (in the figure, #1 cylinder and #4 cylinder, below, also referred to as "rich side cylinders"). In the example which is shown in FIG. 5, the amounts of change of the air-fuel ratio correction amounts in the #1 cylinder and #4 cylinder both become a. As a result, the combustion air-fuel ratios in these cylinders are made air-fuel ratios richer than the average air-fuel ratio by exactly $\Delta AF\alpha$ (corresponding to amount of change $\alpha$). Similarly, in the present embodiment, the amounts of change from the average air-fuel ratio correction amount AFCav in the inter-cylinder air-fuel ratio control are made the same between cylinders made leaner than the average air-fuel ratio (in the figure, #2 cylinder and #3 cylinder, below, also referred to as "lean side cylinders"). In the example which is shown in FIG. 5, the amounts of change of the air-fuel ratio correction amounts in the #2 cylinder and #3 cylinder both become a. As a result, the combustion air-fuel ratios in these cylinders are made air-fuel ratios leaner than the average air-fuel ratio by exactly $\Delta AF\alpha$ (corresponding to amount of change $\alpha$).

Furthermore, in the present embodiment, between the rich side cylinders and the lean side cylinders as well, the amounts of change from the average air-fuel ratio correction amount AFCav are made the same $\alpha$. As a result, the difference between the combustion air-fuel ratio and average air-fuel ratio of a cylinder which is made richer than the average air-fuel ratio becomes equal to the difference between the combustion air-fuel ratio and average air-fuel ratio of a cylinder which is made leaner than the average air-fuel ratio.

In FIG. 4, X indicates the amounts of change of combustion air-fuel ratios from the average air-fuel ratio correction amount AFCav in inter-cylinder air-fuel ratio control. As will be understood from FIG. 4, at the times $t_1$ to $t_2$ when the average air-fuel ratio correction amount AFCav is set to the rich set correction amount AFCrich, at the rich side cylinders (#1 cylinder, #4 cylinder), the air-fuel ratio correction amounts AFC of the cylinders become the rich set correction amount AFCrich minus the amount of change $\alpha$ (AFCrich–$\alpha$). As a result, at the rich side cylinders, the combustion air-fuel ratios are made air-fuel ratios richer than the average air-fuel ratio by exactly $\Delta AF\alpha$ (corresponding to amount of change $\alpha$). Further, at the times $t_1$ to $t_2$, at the lean side cylinders, the air-fuel ratio correction amounts AFC of the cylinders become the rich set correction amount AFCrich plus the amount of change $\alpha$ (AFCrich+$\alpha$). As a result, at the lean side cylinders, the combustion air-fuel ratios are made air-fuel ratios leaner than the average air-fuel ratio by exactly $\Delta AF\alpha$ (corresponding to amount of change $\alpha$). In addition, the amount of change $\alpha$ is made a value larger than the absolute value of the rich set correction amount AFCrich. For this reason, at the lean side cylinders, the combustion air-fuel ratios are controlled so that the combustion air-fuel ratios become lean air-fuel ratios.

Similarly, at the times $t_2$ to $t_3$ where the average air-fuel ratio correction amount AFCav is set to the lean set correction amount AFlean, at the lean side cylinders (#2 cylinder, #3 cylinder), the air-fuel ratio correction amounts AFC of the cylinders become the lean set correction amount AFClean plus the amount of change $\alpha$ (AFClean+$\alpha$). As a result, at the lean side cylinders, the combustion air-fuel ratios are made air-fuel ratios leaner than the average air-fuel ratio by exactly $\Delta AF\alpha$ (corresponding to amount of change $\alpha$). Further, at the times $t_2$ to $t_3$, at the rich side cylinders, the air-fuel ratio correction amounts AFC of the cylinders become the lean set correction amount AFClean minus the amount of change $\alpha$ (AFClean-$\alpha$). As a result, at the rich side cylinders, the combustion air-fuel ratios are made air-fuel ratios richer than the average air-fuel ratio by exactly $\Delta AF\alpha$ (corresponding to amount of change $\alpha$). In addition, the amount of change $\alpha$ is made a value larger than the absolute value of the lean set correction amount AFClean. For this reason, at the rich side cylinders, the combustion air-fuel ratios are controlled so that the combustion air-fuel ratios becomes rich air-fuel ratios.

Note that, the amount of change $\alpha$ is larger than the absolute values of the rich set correction amount AFCrich and lean set correction amount AFClean. For this reason, in inter-cylinder air-fuel ratio control, the difference between the combustion air-fuel ratio of a cylinder which is made richer than the average air-fuel ratio and the combustion air-fuel ratio of a cylinder which is made leaner than the average air-fuel ratio (that is, amplitude in inter-cylinder air-fuel ratio control) is larger than the difference between the rich set air-fuel ratio and lean set air-fuel ratio at the average air-fuel ratio control (that is, amplitude of air-fuel ratio in average air-fuel ratio control).

<Effects of Average Air-Fuel Ratio Control and Inter-Cylinder Air-Fuel Ratio Control>

Figure 6A:
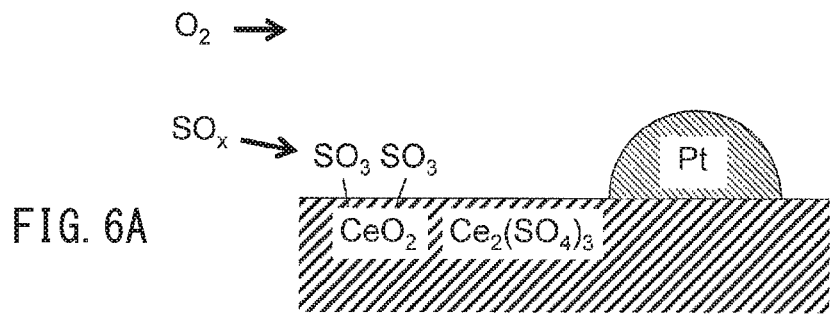
FIGS. 6A to 6C are views which schematically show a carrier surface of an exhaust purification catalyst.
Figure 6B:
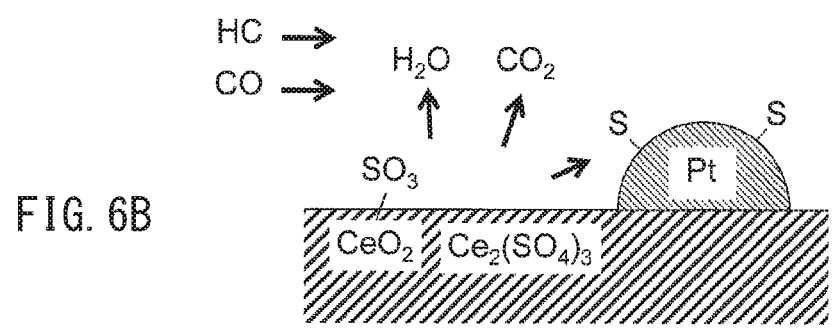
Figure 6C:
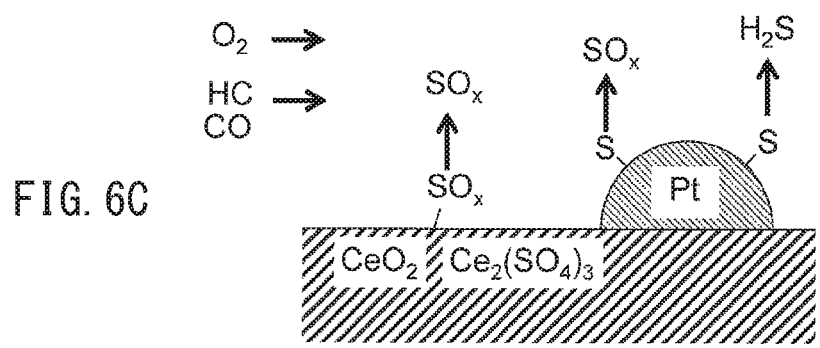

Next, referring to FIGS. 6A to 6C and FIGS. 7A and 7B, the effects due to average air-fuel ratio control and inter-cylinder air-fuel ratio control will be explained. First, referring to FIGS. 6A to 6C, the effect of performing the above-mentioned such average air-fuel ratio control will be explained. FIGS. 6A to 6C are views which schematically show the carrier surfaces of the exhaust purification catalysts 20 and 24. In the example which is shown in FIGS. 6A to 6C, the carriers of the exhaust purification catalysts 20 and 24 contain platinum (Pt) as a precious metal which has a catalytic action and ceria ($CeO_2$) as a substance which has an oxygen storage ability.

In this regard, the fuel which is supplied into the internal combustion engine contains a sulfur content, though slight, therefore the exhaust gas which is discharged from the combustion chamber 5 contains a slight amount of sulfur oxides ($SO_x$). When the temperatures of the exhaust purification catalysts 20 and 24 do not become that high (for example, are 600° C. or less), if the $SO_x$ which is contained in the exhaust gas flows into the exhaust purification catalysts 20 and 24, even if the air-fuel ratio of the exhaust gas is a substantially stoichiometric air-fuel ratio, the $SO_x$ is physically adsorbed at the ceria on the carrier by Van der Waals force. However, the $SO_x$ which is contained in the exhaust gas is firmly stored by the ceria on the carriers if the air-fuel ratio of the exhaust gas is the lean air-fuel ratio.

FIG. 6A shows the state where the exhaust gas of a lean air-fuel ratio flows into the exhaust purification catalysts 20 and 24 when the temperature of the exhaust purification catalysts 20 and 24 is not that high (for example, 600° C. or less). Therefore, in the state which is shown in FIG. 6A, the exhaust gas which flows into the exhaust purification catalysts 20 and 24 contains a large amount of excess oxygen. If the exhaust gas which flows into the exhaust purification catalysts 20 and 24 contains excess oxygen, the $SO_x$ which is contained in the exhaust gas is chemically adsorbed at the ceria as $SO_3$. According to this chemical adsorption, $SO_x$ is adsorbed at the ceria more firmly than the above-mentioned physical adsorption. Further, if the excess oxygen which is contained in the exhaust gas becomes further greater, that is, if the lean degree of the air-fuel ratio of the exhaust gas becomes larger, the $SO_x$ which is contained in the exhaust gas reacts with the ceria to become $Ce_2(SO_4)_3$ and be absorbed. By such absorption, $SO_x$ is firmly absorbed at the ceria by the above-mentioned chemical adsorption. Note that, in the following explanation, $SO_x$ being "adsorbed" and "absorbed" at the ceria will be referred to all together as the $SO_x$ being "stored" at the ceria.

In such a state, if exhaust gas exhaust gas of a rich air-fuel ratio flows into the exhaust purification catalysts 20 and 24, the sulfur content of the $SO_x$ which is stored in the ceria moves on to the platinum. This state is shown in FIG. 6B. As shown in FIG. 6B, if exhaust gas of a rich air-fuel ratio flows into the exhaust purification catalysts 20 and 24, the exhaust gas contains a large amount of excess unburned HC and CO. For this reason, the $SO_x$ which is stored in the ceria is broken down by the unburned HC and CO resulting in the production of water ($H_2O$) and carbon dioxide ($CO_2$). In addition, the sulfur content which is produced by breakdown of $SO_x$ is adsorbed on the surface of the platinum. In this way, if the sulfur content which is adsorbed on the surface of the platinum increases and covers the surface of the platinum, the area by which the platinum contacts the surrounding gas decreases thereby inviting a drop in the catalytic activity of the platinum.

Note that, breakdown of sulfur which is stored in the ceria becomes harder the stronger $SO_x$ is stored at the ceria. Therefore, compared with when $SO_x$ is chemically adsorbed at the ceria, when $SO_x$ is absorbed in the ceria as $Ce_2(SO_4)_3$, breakdown of sulfur which is stored in the ceria becomes harder and therefore movement of the sulfur content from the ceria to the platinum does not easily occur. For this reason, movement of sulfur content when $SO_x$ is absorbed at the ceria does not occur, compared with when $SO_x$ is chemically adsorbed at ceria, if the rich degree of the air-fuel ratio of the exhaust gas is not large or if the temperature of the exhaust purification catalysts 20 and 24 is not high.

In this way, in the state where the sulfur content is adsorbed on the surface of the platinum, the exhaust purification catalysts 20 and 24 become high in temperature (for example, 600° C. or more). If rich air-fuel ratio exhaust gas flows into the exhaust purification catalysts 20 and 24, the sulfur content which is adsorbed on the surfaces of the platinum is made to separate. This state is shown in FIG. 6C. As shown in FIG. 6C, if rich air-fuel ratio exhaust gas flows into the exhaust purification catalysts 20 and 24, the inflowing exhaust gas contains a large amount of excess unburned HC and CO. Further, even when the air-fuel ratio of the exhaust gas is a rich air-fuel ratio, the exhaust gas contains oxygen, though slight. For this reason, if the exhaust purification catalysts 20 and 24 are high in temperature, the sulfur content which is adsorbed on the platinum surfaces reacts with the unburned HC, CO, and oxygen in the exhaust gas to become $SO_x$ and $H_2S$ which are made to be separated from the platinum surface. Note that, at this time, the $SO_x$ which is stored at the ceria is also made to separate without being absorbed at the platinum surfaces.

Here, during operation of the internal combustion engine, the temperature of the exhaust purification catalysts 20 and 24 is not constantly maintained at a high temperature (for example, 720° C. or more). Depending on the engine operating state, it is sometimes maintained at a certain degree of low temperature (for example, less than 720° C.). When in this way the exhaust purification catalysts 20 and 24 are maintained at a certain degree of low temperature, if the air-fuel ratio of the exhaust gas which flows into the exhaust purification catalysts 20 and 24 becomes a rich air-fuel ratio, as shown in FIG. 6B, the sulfur content move from the ceria to the platinum surfaces and a drop of the catalytic activity of the platinum ends up being invited.

As opposed to this, in the exhaust purification system which is shown in FIG. 4, in the average air-fuel ratio control, the lean shift amount is made smaller than the rich shift amount. Due to this, the time period during which the average air-fuel ratio is lean becomes longer than the time period during which the average air-fuel ratio is rich. In this way, the average air-fuel ratio control which is shown in FIG. 4, the time period in which the average exhaust air-fuel ratio of the exhaust gas which flows into the upstream side exhaust purification catalyst 20 is lean becomes longer or the time period in which the average exhaust air-fuel ratio is rich becomes shorter. For this reason, it becomes harder for the sulfur content to move from the ceria to the platinum surface and accordingly becomes possible to suppress the drop in catalytic activity of the platinum.

Note that, from the viewpoint of making the time period when the average exhaust air-fuel ratio is lean longer and making the time period when the average exhaust air-fuel ratio is rich shorter, it is preferable that the lean shift amount be as small as possible and that the rich shift amount be as large as possible. That is, the difference between the lean shift amount and the rich shift amount is preferably made as large as possible.

Figure 7A:
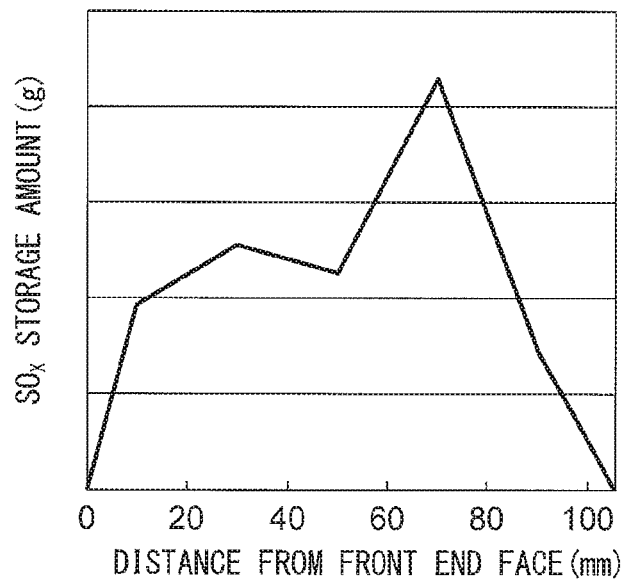
FIGS. 7A and 7B are views which show the relationship between a distance from a front end surface of an upstream side exhaust purification catalyst and a storage amount of $SO_x$ per unit volume.
Figure 7B:
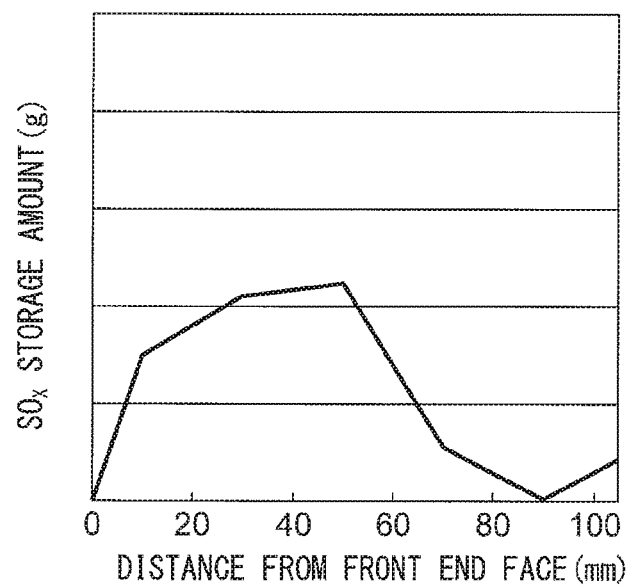

Next, referring to FIGS. 7A and 7B, the effect of performing inter-cylinder air-fuel ratio control will be explained. FIGS. 7A and 7B show the relationship between the distance from the upstream side end face of the upstream side exhaust purification catalyst in the direction of flow of exhaust (front end face) and the storage amount of the $SO_x$ in the precious metal and carrier per unit volume of the exhaust purification catalyst and shows the results of experiments when using fuel with a high sulfur content concentration to operate the internal combustion engine for a predetermined time.

FIG. 7A shows the results when maintaining the average exhaust air-fuel ratio of the exhaust gas which flows into the upstream side exhaust purification catalyst at the lean air-fuel ratio and not performing the above-mentioned inter-cylinder air-fuel ratio control. Therefore, FIG. 7A shows the results when the combustion air-fuel ratios are maintained at the lean air-fuel ratios at all cylinders. As will be understood from FIG. 7A, when inter-cylinder air-fuel ratio control is not being performed, $SO_x$ is stored across the entire direction of flow of exhaust of the upstream side exhaust purification catalyst and in particular a large amount of $SO_x$ is stored at the back.

On the other hand, FIG. 7B shows the results when maintaining the average exhaust air-fuel ratio of the exhaust gas which flows into the upstream side exhaust purification catalyst at the lean air-fuel ratio and performing the above-mentioned inter-cylinder air-fuel ratio control. Therefore, FIG. 7B shows the results in the case when the combustion air-fuel ratio is made to shift to the rich side and lean side from the lean air-fuel ratio for each cylinder. As will be understood from FIG. 7B, when performing inter-cylinder air-fuel ratio control, a large amount of $SO_x$ is stored in the front of the upstream side exhaust purification catalyst in the direction of flow of exhaust and almost no $SO_x$ is stored in the back.

In this way, as the reason why $SO_x$ is stored at the front of the upstream side exhaust purification catalyst when performing inter-cylinder air-fuel ratio control, the existence of a relationship between the storage of $SO_x$ and adsorption and release of oxygen may be considered. When performing inter-cylinder air-fuel ratio control, exhaust gas which contains excess unburned HC and CO is discharged from a cylinder with a combustion air-fuel ratio of a rich air-fuel ratio. On the other hand, exhaust gas which contains excess unburned oxygen is discharged from a cylinder with a combustion air-fuel ratio of a lean air-fuel ratio. As a result, the exhaust gas which flows into the upstream side exhaust purification catalyst contains large amounts of unburned HC, CO, and oxygen even if the average exhaust air-fuel ratio is the stoichiometric air-fuel ratio.

As a result, when performing inter-cylinder air-fuel ratio control (FIG. 7B), oxygen is actively adsorbed and released at the front of the upstream side exhaust purification catalyst. Here, storage of $SO_x$ at the carrier of the upstream side exhaust purification catalyst is believed to easily occur in the region of the upstream side exhaust purification catalyst where oxygen is actively absorbed and released. For this reason, when performing inter-cylinder air-fuel ratio control, a large amount of $SO_x$ is stored at the front of the upstream side exhaust purification catalyst where oxygen is actively absorbed and released. As a result, $SO_x$ is no longer stored at the back.

On the other hand, when not performing inter-cylinder air-fuel ratio control (FIG. 7A), the unburned HC, CO, and oxygen which are contained in the exhaust gas which flows into the upstream side exhaust purification catalyst are not that great. For this reason, at the front side of the upstream side exhaust purification catalyst, not that active a reaction occurs. Therefore, at the front side, oxygen is not actively absorbed or released. As a result, oxygen is actively absorbed and released at the middle to back of the upstream side exhaust purification catalyst. For this reason, when not performing inter-cylinder air-fuel ratio control, $SO_x$ is stored over the entire region in the direction of flow of exhaust. In particular, it is believed that a large amount of $SO_x$ is stored from the middle to the back of the upstream side exhaust purification catalyst. Note that, in the example which is shown in FIGS. 7A and 7B, the case is shown where the average exhaust air-fuel ratio of the exhaust gas which flows into the upstream side exhaust purification catalyst is maintained at the stoichiometric air-fuel ratio, but a similar trend is observed when the average exhaust air-fuel ratio of the exhaust gas which flows into the upstream side exhaust purification catalyst is maintained at the lean air-fuel ratio.

Here, the maximum storable oxygen amount Cmax of the upstream side exhaust purification catalyst changes in accordance with the state of storage of $SO_x$. Specifically, if $SO_x$ is stored in a certain region of the upstream side exhaust purification catalyst, the amount of oxygen which can be stored in that region decreases. That is, in the region where $SO_x$ is stored, part of the sulfur content is adsorbed at the precious metal surface. If the sulfur content is adsorbed at the precious metal surface in this way, the catalytic activity at the precious metal falls, therefore in the state where the carrier around this precious metal stores oxygen, even if exhaust gas which contains unburned HC and CO flows into the upstream side exhaust purification catalyst, the stored oxygen and unburned HC and CO can no longer be made to react. Accordingly, it is no longer possible to release the oxygen which is stored in the upstream side exhaust purification catalyst and as a result a decrease in the maximum storable oxygen amount Cmax is invited.

Therefore, when not performing inter-cylinder air-fuel ratio control (FIG. 7A), $SO_x$ is stored across the entire direction of flow of exhaust of the upstream side exhaust purification catalyst, therefore the maximum storable oxygen amount Cmax of the upstream side exhaust purification catalyst becomes smaller. As opposed to this, when performing inter-cylinder air-fuel ratio control (FIG. 7B), a region remains where almost no $SO_x$ is stored at the back of the upstream side exhaust purification catalyst. As a result, in this case, a drop in the maximum storable oxygen amount Cmax can be suppressed.

Further, if performing the inter-cylinder air-fuel ratio control when the average air-fuel ratio correction amount AFCav is the lean set correction amount AFClean (for example, times $t_2$ to $t_3$ of FIG. 3), at a lean side cylinder, the air-fuel ratio correction amount AFC becomes the lean set correction amount AFClean plus the amount of change $\alpha$. As a result, the combustion air-fuel ratio of the lean side cylinder is lean with a large lean degree.

Here, as explained with reference to FIG. 6A, the larger the lean degree of the air-fuel ratio of the exhaust gas which flows into the upstream side exhaust purification catalyst 20, the more strongly the $SO_x$ is stored at the ceria. Therefore, by performing average air-fuel ratio control plus additional inter-cylinder air-fuel ratio control, the $SO_x$ can be made to be firmly stored at the ceria and therefore the movement of sulfur content from the ceria to the platinum surface can be suppressed.

From the above, according to the air-fuel ratio control which is shown in FIG. 4, by performing the above-mentioned such average air-fuel ratio control, the sulfur content which was adsorbed at the carrier (ceria etc.) can be kept from moving to the precious metal (platinum etc.). Due to this, it is possible to suppress a drop in catalytic activity of the precious metal. In addition, by performing the above-mentioned such inter-cylinder air-fuel ratio control, it is possible to suppress the storage of $SO_x$ in the carrier at the rear of the upstream side exhaust purification catalyst 20. Due to this, it is possible to suppress a drop in the maximum storable oxygen amount. Furthermore, even by performing the above-mentioned inter-cylinder air-fuel ratio control, it is possible to keep the sulfur content which was adsorbed at the carrier from moving to the precious metal.

Note that, in the above embodiment, in inter-cylinder air-fuel ratio control, the amount of change $\alpha$ becomes the same in all of the rich side cylinders. Accordingly, the combustion air-fuel ratio becomes the same. However, there is no need to make the amount of change $\alpha$ constant at all of the rich side cylinders. It may also be possible to make it a value which differs in amount of change even between cylinders at the rich side. In this case, the combustion air-fuel ratio will differ between the rich side cylinders. Further, the same can be said for the lean side cylinders.

Further, in the above embodiment, in inter-cylinder air-fuel ratio control, the combustion air-fuel ratio is made to shift to either the rich side or the lean side from the average air-fuel ratio in all of the cylinders. However, in inter-cylinder air-fuel ratio control, in part of the cylinders, the amount of change may be made zero and combustion air-fuel ratio may be made to match the average air-fuel ratio.

In addition, in the above embodiment, in inter-cylinder air-fuel ratio control, the number of the rich side cylinders and the number of the lean side cylinders are the same. However, the number of the rich side cylinders and the number of the lean side cylinders need not necessarily be the same. Therefore, for example, in the case of a four-cylinder internal combustion engine, just one cylinder may be made a cylinder made to shift to the rich side and the remaining three cylinders or two of the remaining three cylinders may be made cylinders made to shift to the lean side.

However, in each case, when the average air-fuel ratio is controlled to the lean air-fuel ratio by average air-fuel ratio control, inter-cylinder air-fuel ratio control has to be performed so that the combustion air-fuel ratio becomes the rich air-fuel ratio at least at one cylinder among the plurality of cylinders. Further, even when the average air-fuel ratio is controlled to the rich air-fuel ratio by average air-fuel ratio control, inter-cylinder air-fuel ratio control is preferably performed so that the combustion air-fuel ratio becomes the lean air-fuel ratio at least at one cylinder among the plurality of cylinders. Further, in inter-cylinder air-fuel ratio control, the combustion air-fuel ratios of the cylinders are preferably controlled so as to become richer than the average air-fuel ratio at part of the cylinders among the plurality of cylinders and so as to become leaner than the average air-fuel ratio at the remaining cylinders among the plurality of cylinders.

<Explanation of Specific Control>

Figure 8:
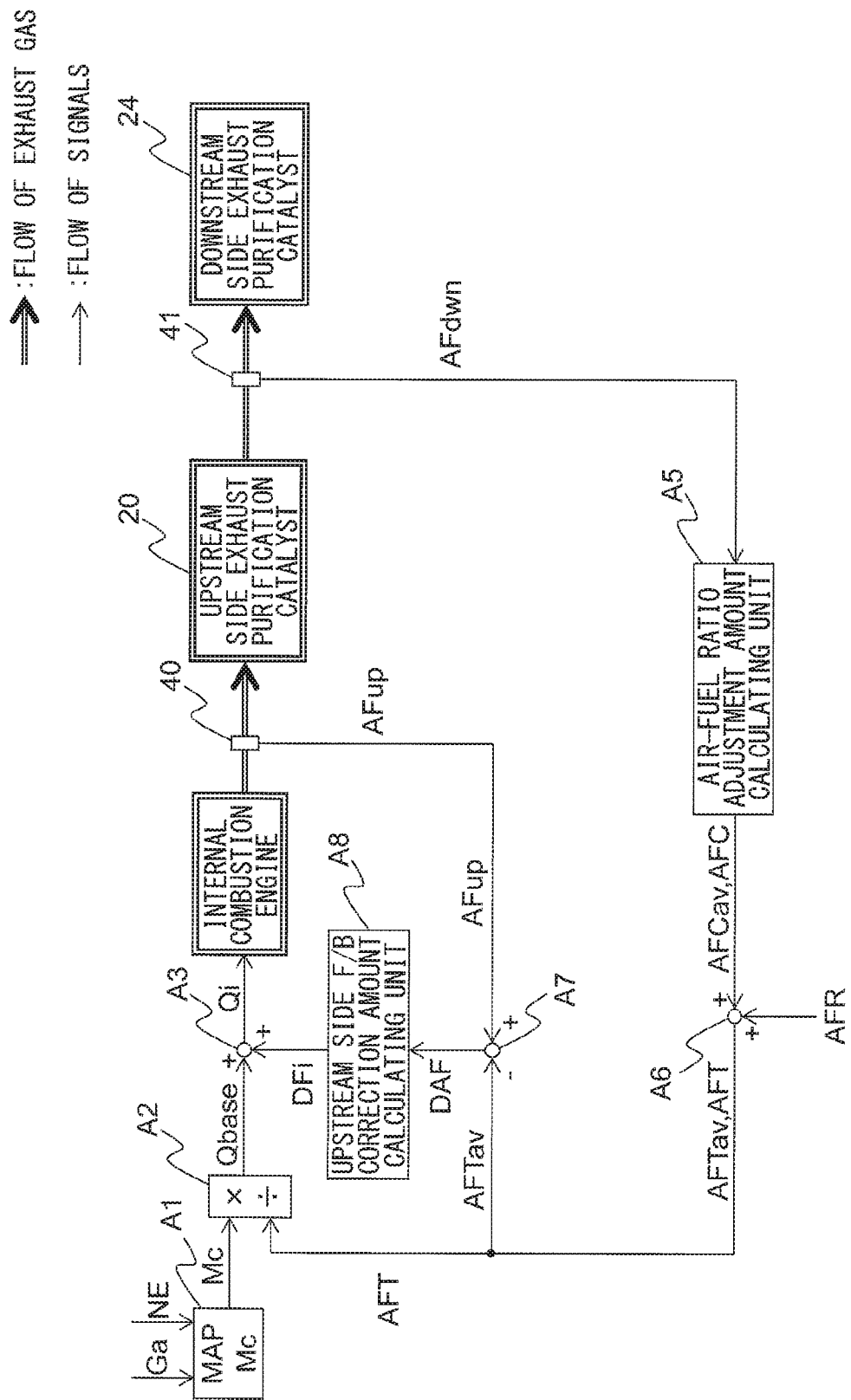
FIG. 8 is a functional block diagram of a control device.
Figure 9:
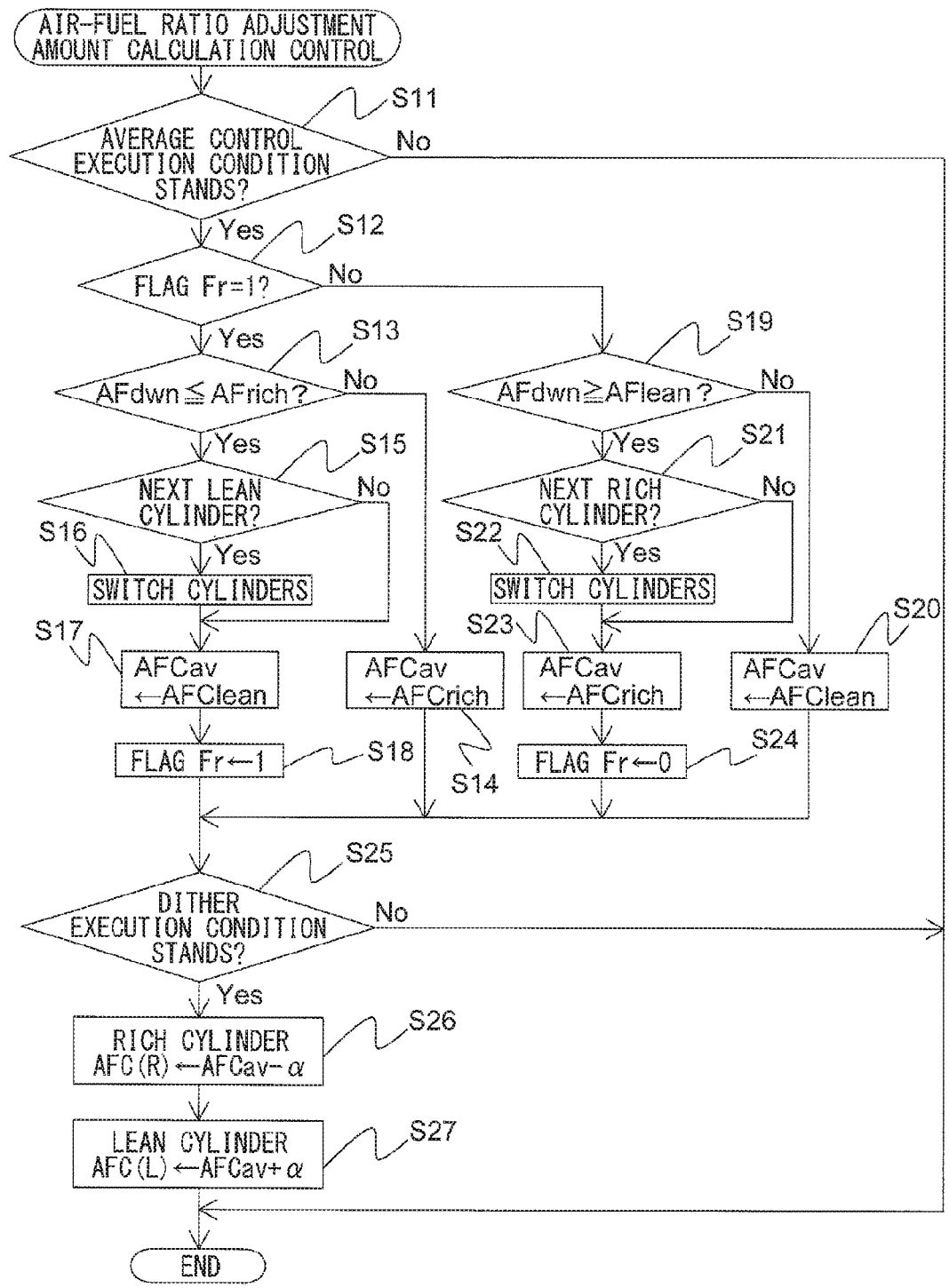
FIG. 9 is a flow chart which shows a control routine of processing for calculating an air-fuel ratio correction amount in a first embodiment.

Next, referring to FIG. 8 and FIG. 9, the control device of the exhaust purification system in the above embodiment will be specifically explained. The control device in the present embodiment is comprised of the functional blocks A1 to A8 in the functional block diagram of FIG. 8. Below, the functional blocks will be explained while referring to FIG. 8. The operations at these functional blocks A1 to A8 are basically performed in the ECU 31 which functions as a control device for controlling the exhaust purification system of the internal combustion engine.

<Calculation of Fuel Injection Amount>

First, the calculation of the fuel injection amount will be explained. In calculating the fuel injection amount, the cylinder intake air amount calculating unit Al, basic fuel injection amount calculating unit A2, and fuel injection amount calculating unit A3 are used.

The cylinder intake air amount calculating unit A1 calculates the amount of intake air MC to the cylinders based on the amount of flow Ga of intake air, engine speed NE, and map or calculation formula which is stored in the ROM 34 of the ECU 31. The amount of flow of intake air Ga is measured by the air flow meter 39, while the engine speed NE is calculated based on the output of the crank angle sensor 44.

The basic fuel injection amount calculating unit A2 divides the cylinder intake air amount Mc, which was calculated by the cylinder intake air amount calculating unit Al, by the target air-fuel ratio AFT, to thereby calculate the basic fuel injection amount Qbase (Qbase=Mc/AFT). The target air-fuel ratio AFT is calculated by the later explained target air-fuel ratio setting unit A6.

The fuel injection amount calculating unit A3 adds the basic fuel injection amount Qbase, which was calculated by the basic fuel injection amount calculating unit A2, and the later explained F/B correction amount DFi, to thereby calculate the fuel injection amount Qi (Qi=Qbase+DFi). The fuel injector 11 is instructed to inject fuel so that the thus calculated fuel injection amount Qi of fuel is injected from the fuel injector 11.

<Calculation of Target Air-Fuel Ratio>

Next, the calculation of the target air-fuel ratio will be explained. In calculating the target air-fuel ratio, the air-fuel ratio correction amount calculating unit A5 and the target air-fuel ratio setting unit A6 are used.

In the air-fuel ratio correction amount calculating unit A5, the average air-fuel ratio correction amount AFCav and the air-fuel ratio correction amount AFC of each cylinder are calculated based on the output air-fuel ratio AFdwn of the downstream side air-fuel ratio sensor 41. Specifically, the average air-fuel ratio correction amount AFCav and the air-fuel ratio correction amount AFC are calculated based on the flow chart shown in FIG. 9.

The target air-fuel ratio setting unit A6 calculates the target average air-fuel ratio AFTav and the target air-fuel ratio AFT of each cylinder by adding the average air-fuel ratio correction amount AFCav and the air-fuel ratio correction amount AFC of each cylinder which were calculated by the air-fuel ratio correction amount calculating unit A5 to the control center air-fuel ratio (in the present embodiment, the stoichiometric air-fuel ratio) AFR. The thus calculated target air-fuel ratio AFT is input to the basic fuel injection amount calculating unit A2 and the target average air-fuel ratio AFTav is input to the later explained air-fuel ratio deviation calculating unit A7.

<Calculation of F/B Correction Amount>

Next, the calculation of the F/B correction amount based on the output air-fuel ratio AFup of the upstream side air-fuel ratio sensor 40 will be explained. In calculating the F/B correction amount, the air-fuel ratio deviation calculating unit A7 and the F/B correction amount calculating unit A8 are used.

The air-fuel ratio deviation calculating unit A7 subtracts, from the output air-fuel ratio AFup of the upstream side air-fuel ratio sensor 40, the target average air-fuel ratio AFTav which was calculated by the target air-fuel ratio setting unit A6 to thereby calculate the air-fuel ratio deviation DAF (DAF=AFup−AFTav). This air-fuel ratio deviation DAF is a value which expresses the excess/deficiency of the amount of feed of fuel with respect to the target average air-fuel ratio AFTay.

The F/B correction amount calculating unit A8 processes the air-fuel ratio deviation DAF, which was calculated by the air-fuel ratio deviation calculating unit A7, by proportional-integral-derivative processing (PID processing) so as to calculate the F/B correction amount DFi for compensating for the excess/deficiency of the amount of fuel feed, based on the following formula (1). The thus calculated F/B correction amount DFi is input to the fuel injection amount calculating unit A3.

$$DFi = Kp \cdot DAF + Ki \cdot SDAF + Kd \cdot DDAF \tag{1}$$

Note that, in the above formula (1), Kp is a preset proportional gain (proportional constant), Ki is a preset integral gain (integral constant), and Kd is a preset derivative gain (derivative constant). Further, DDAF is a time derivative value of the air-fuel ratio deviation DAF and is calculated by dividing the difference between the currently updated air-fuel ratio deviation DAF and the previously updated air-fuel ratio deviation DAF by the time corresponding to the updating interval. Further, SDAF is a time integral value of the air-fuel ratio deviation DAF. This time integral value DDAF is calculated by adding the previously updated time integral value DDAF and the currently updated air-fuel ratio deviation DAF (SDAF=DDAF+DAF).

<Flow Chart>

FIG. 9 is a flow chart which shows a control routine of processing for calculating an air-fuel ratio correction amount in the present embodiment. The illustrated control routine is performed by interruption at certain time intervals.

First, at step S11, it is judged if a condition for execution of average air-fuel ratio control stands. The condition for execution of average air-fuel ratio control will be explained later. When it is judged that the condition for execution of average air-fuel ratio control does not stand, the control routine is made to end. On the other hand, when it is judged that the condition for execution of average air-fuel ratio control stands, the routine proceeds to step S12. At step S12, it is judged if the rich flag Fr is "1". The rich flag Fr is a flag which is set to "1" when the average air-fuel ratio is controlled to the rich air-fuel ratio in average air-fuel ratio control and is set to "0" when controlled to the lean air-fuel ratio.

If, in average air-fuel ratio control, the average air-fuel ratio is controlled to the rich air-fuel ratio, at step S12, it is judged that the rich flag Fr is "1", then the routine proceeds to step S13. At step S13, it is judged if the output air-fuel ratio AFdwn of the downstream side air-fuel ratio sensor 41 becomes the rich judged air-fuel ratio AFrich or less. If the air-fuel ratio of the exhaust gas which flows out from the upstream side exhaust purification catalyst 20 has become substantially the stoichiometric air-fuel ratio, at step S13, it is judged that the output air-fuel ratio AFdwn of the downstream side air-fuel ratio sensor 41 is larger than the rich judged air-fuel ratio AFrich, then the routine proceeds to step S14. At step S14, the average air-fuel ratio correction amount AFCav is set to the rich set correction amount AFCrich. Due to this, the average air-fuel ratio is maintained at the rich air-fuel ratio.

Next, at step S25, it is judged if the condition for execution of inter-cylinder air-fuel ratio control (dither control) stands. The condition for execution of the inter-cylinder air-fuel ratio control will be explained later. If it is judged that the condition for execution of inter-cylinder air-fuel ratio control does not stand, the control routine is made to end. On the other hand, when it is judged that the condition for execution of inter-cylinder air-fuel ratio control stands, the routine proceeds to step S26. At step S26, the average air-fuel ratio correction amount AFCav minus the predetermined amount of change α is made the air-fuel ratio correction amount AFC(R) of the rich side cylinder. Next, at step S27, the average air-fuel ratio correction amount AFCav plus a predetermined amount of change α is made the air-fuel ratio correction amount AFC(L) of the lean side cylinder, then the control routine is made to end.

After that, if the air-fuel ratio of the exhaust gas which flows out from the upstream side exhaust purification catalyst 20 becomes the rich air-fuel ratio, at the next control routine, at step S13, it is judged that the output air-fuel ratio AFdwn of the downstream side air-fuel ratio sensor 41 becomes the rich judged air-fuel ratio AFrich or less, then the routine proceeds to step S15. At step S15, it is judged if the cylinder at which combustion is next performed is a lean cylinder. When a rich cylinder, step S16 is skipped. On the other hand, if, at step S15, it is judged that the cylinder at which combustion is next performed is a lean cylinder, the routine proceeds to step S16. At step S16, the rich side cylinders and lean side cylinders are switched. Therefore, a cylinder which had been deemed a rich side cylinder in the inter-cylinder air-fuel ratio control up to then is switched to a lean side cylinder. Next, at step S17, the average air-fuel ratio correction amount AFCav is set to the lean set correction amount AFClean. Next, at step S18, the rich flag Fr is set to "1", then the routine proceeds to step S25.

If the rich flag Fr is set to "1", at the next control routine, the routine proceeds from step S12 to step S19. At step S19, it is judged if the output air-fuel ratio AFdwn of the downstream side air-fuel ratio sensor 41 is the lean judged air-fuel ratio AFlean or more. If the air-fuel ratio of the exhaust gas which flows out from the upstream side exhaust purification catalyst 20 becomes substantially the stoichiometric air-fuel ratio, at step S19, it is judged that the output air-fuel ratio AFdwn of the downstream side air-fuel ratio sensor 41 is smaller than the lean judged air-fuel ratio AFlean, then the routine proceeds to step S20. At step S20, the average air-fuel ratio correction amount AFCav is set to the lean set correction amount AFClean. Due to this, the average air-fuel ratio is maintained at the lean air-fuel ratio, then the routine proceeds to step S25.

After that, if the air-fuel ratio of the exhaust gas which flows out from the upstream side exhaust purification catalyst 20 becomes the lean air-fuel ratio, at the next control routine, at step S19, it is judged that the output air-fuel ratio AFdwn of the downstream side air-fuel ratio sensor 41 is the lean judged air-fuel ratio AFlean or more, then the routine proceeds to step S21. At step S21, it is judged if the cylinder at which combustion is next performed is a rich cylinder. When a lean cylinder, step S22 is skipped. On the other hand, if, at step S21, it is judged that the cylinder at which combustion is next performed is a rich cylinder, the routine proceeds to step S22. At step S22, the rich side cylinders and the lean side cylinders are switched. Next, at step S23, the average air-fuel ratio correction amount AFCav is set to the rich set correction amount AFCrich. Next, at step S24, the rich flag Fr is reset to "0", then the routine proceeds to step S25.

<Catalyst Temperature and Air-Fuel Ratio Control>

In the present embodiment, the temperature of the upstream side exhaust purification catalyst 20 is used as the basis to change the mode of control in average air-fuel ratio control and inter-cylinder air-fuel ratio control. Below, the modes of control of the average air-fuel ratio control and inter-cylinder air-fuel ratio control based on the temperature of the upstream side exhaust purification catalyst 20 will be explained.

In the present embodiment, when the temperature of the upstream side exhaust purification catalyst 20 is less than a predetermined switching temperature, as shown in FIG. 4, the average air-fuel ratio is controlled so that in average air-fuel ratio control, the lean shift amount becomes smaller than the rich shift amount. On the other hand, when the temperature of the upstream side exhaust purification catalyst 20 is the predetermined switching temperature or more, the average air-fuel ratio is controlled so that in average air-fuel ratio control, the lean shift amount becomes larger than the rich shift amount.

In addition, in the present embodiment, when the temperature of the upstream side exhaust purification catalyst 20 is less than a predetermined switching temperature, the above-mentioned inter-cylinder air-fuel ratio control is performed. The above-mentioned inter-cylinder air-fuel ratio control is performed even if the switching temperature or more. However, when the temperature of the upstream side exhaust purification catalyst 20 is higher than the upper limit temperature (for example, 800° C.), the above-mentioned inter-cylinder air-fuel ratio control is not performed. The combustion air-fuel ratios of all cylinders are controlled so that the combustion air-fuel ratios become equal at all cylinders. Note that, the upper limit temperature is a temperature higher than the switching temperature.

Figure 10:
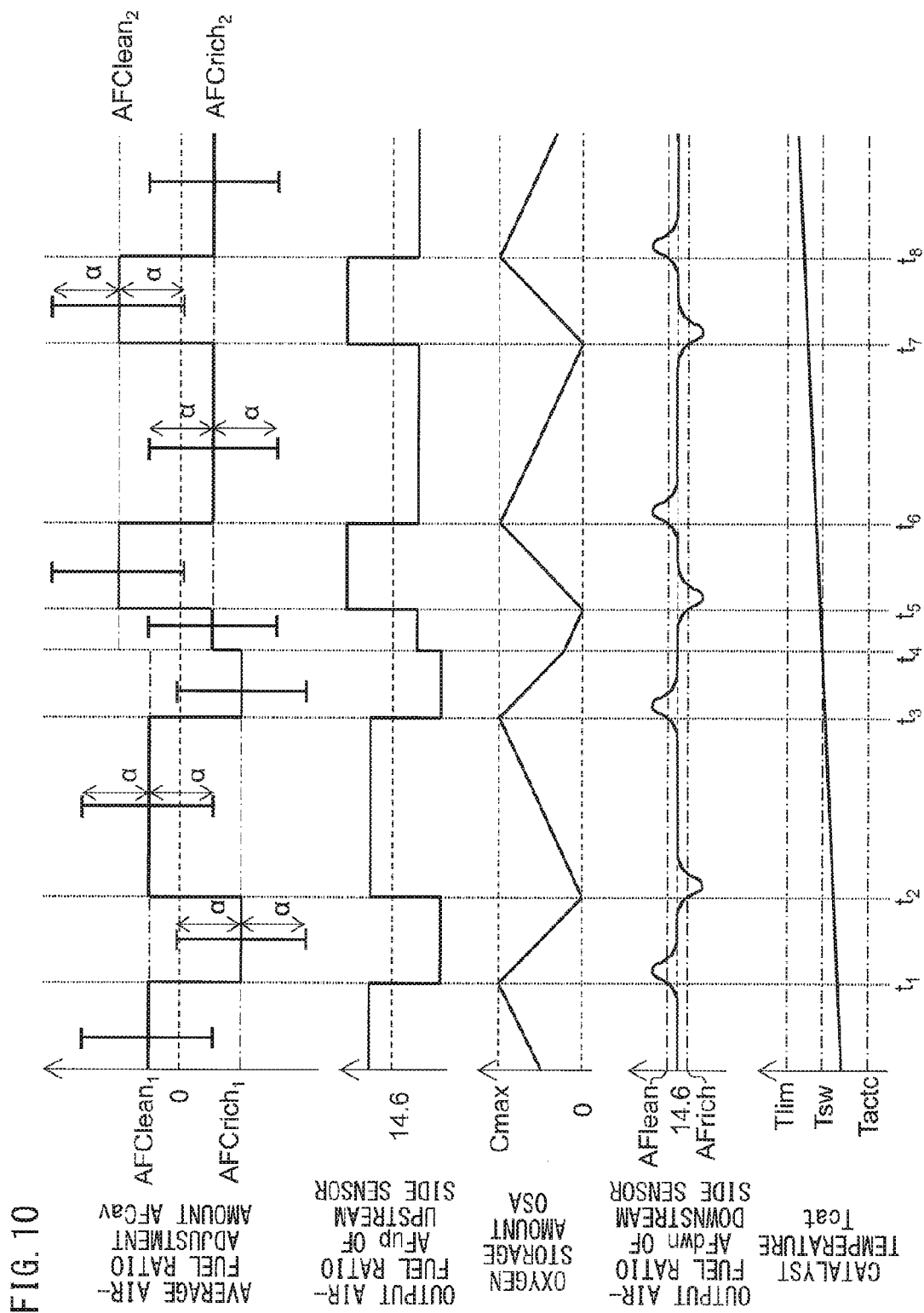
FIG. 10 is a time chart of an average air-fuel ratio correction amount etc.
Figure 11:
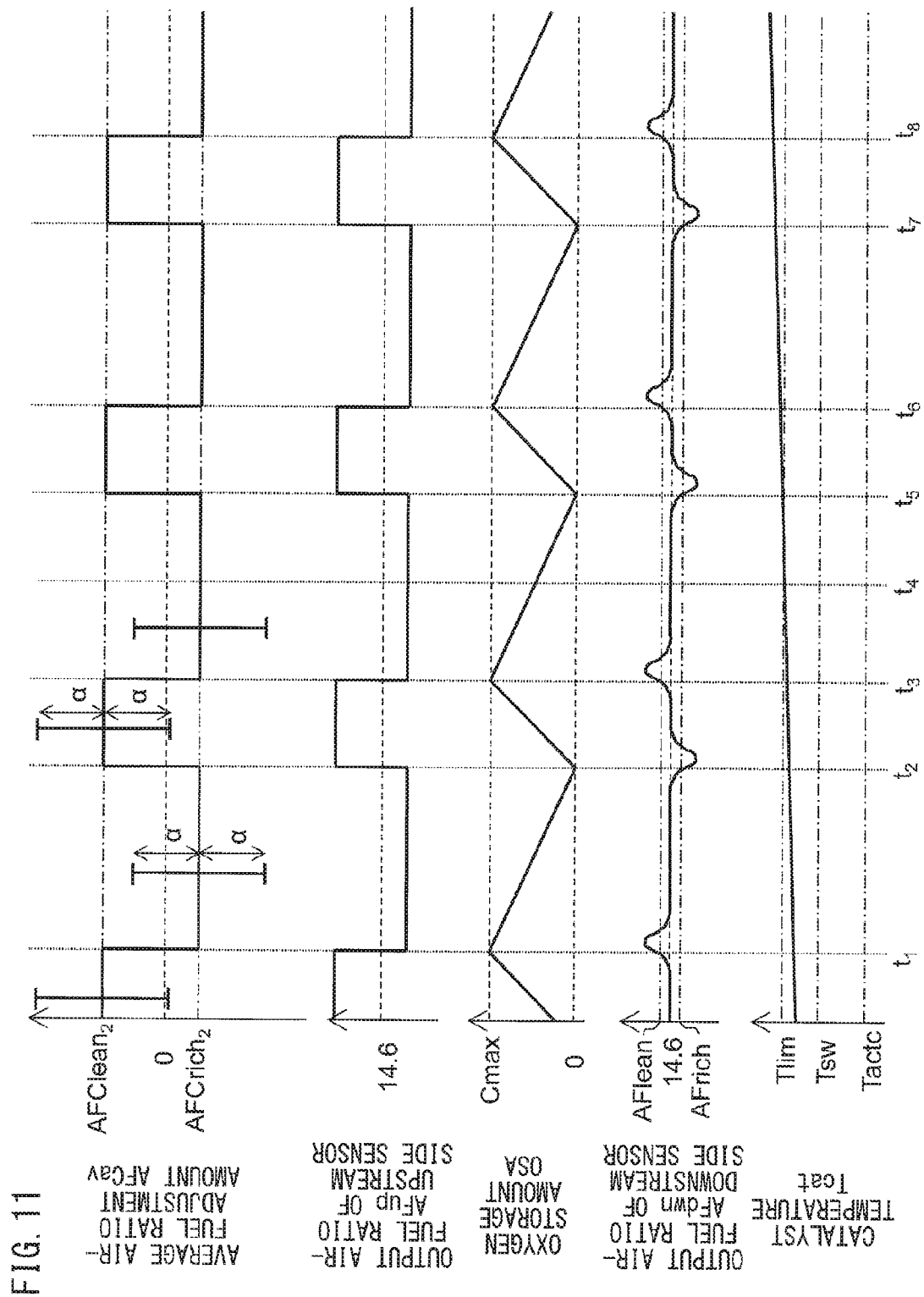
FIG. 11 is a time chart of an average air-fuel ratio correction amount etc.

Referring to FIG. 10 and FIG. 11, the average air-fuel ratio control and inter-cylinder air-fuel ratio control in the present embodiment will be specifically explained. FIG. 10 is a time chart similar to FIG. 4 of the average air-fuel ratio correction amount AFCav etc. In the example which is shown in FIG. 10, basically air-fuel ratio control similar to the example which is shown in FIG. 4 is performed.

As will be understood from FIG. 10, before the time $t_4$, the temperature Tcat of the upstream side exhaust purification catalyst 20 is between the activation temperature Tactc up to less than the switching temperature Tsw. At this time, the rich set correction amount at the average air-fuel ratio control AFCrich is set to the predetermined first rich set correction amount $AFCrich_1$, while the lean set correction amount AFClean is set to a predetermined first lean set correction amount $AFClean_1$. In the same way as the example which is shown in FIG. 4, the absolute value of the first lean set correction amount $AFClean_1$ is made a value smaller than the absolute value of the first rich set correction amount $AFCrich_1$.

Therefore, before the time $t_4$, the difference between the average air-fuel ratio and the control center air-fuel ratio (stoichiometric air-fuel ratio) when controlling the average air-fuel ratio of the exhaust gas which flows into the upstream side exhaust purification catalyst 20 to the lean air-fuel ratio, constituting the "lean shift amount", is made smaller than the difference between the average air-fuel ratio and control center air-fuel ratio when controlling the average air-fuel ratio to the rich air-fuel ratio, constituting the "rich shift amount". Due to this, before the time $t_4$, the time period in which the average air-fuel ratio correction amount AFCav is set to the lean set correction amount AFClean (for example, times $t_2$ to $t_3$) becomes longer than the time period at which the average air-fuel ratio correction amount AFCav is set to the rich set correction amount AFCrich (for example, times $t_1$ to $t_2$). That is, the time period during which the average air-fuel ratio becomes the lean air-fuel ratio is made longer than the time period during which it becomes the rich air-fuel ratio.

In addition, as will be understood from FIG. 10, before the time $t_4$, in the same way as the example which is shown in FIG. 4, inter-cylinder air-fuel ratio control is performed. In inter-cylinder air-fuel ratio control, at a rich side cylinder, the air-fuel ratio correction amount AFC becomes the average air-fuel ratio correction amount AFCav minus the amount of change α, while at a lean side cylinder, the air-fuel ratio correction amount AFC is made the average air-fuel ratio correction amount AFCav plus the amount of change α. The amount of change α is larger than the absolute value of the first rich set correction amount $AFCrich_1$ and the absolute value of the first lean set correction amount $AFClean_1$ in the same way as the example which is shown in FIG. 4.

On the other hand, as will be understood from FIG. 10, at the time $t_4$ on, the temperature Tcat of the upstream side exhaust purification catalyst 20 becomes the switching temperature Tsw or more. In the present embodiment, at this time, at the average air-fuel ratio control, the rich set correction amount AFCrich is set to the predetermined second rich set correction amount $AFCrich_2$, while the lean set correction amount AFClean is set to the predetermined predetermined the second lean set correction amount $AFClean_2$. The absolute value of the second rich set correction amount $AFCrich_2$ is made a value larger than the absolute value of the second lean set correction amount $AFClean_2$. Further, the absolute value of the second rich set correction amount $AFCrich_2$ is made a value smaller than the absolute value of the first rich set correction amount $AFCrich_1$. On the other hand, the absolute value of the second lean set correction amount $AFClean_2$ is made a value larger than the absolute value of the first lean set correction amount $AFClean_1$.

Therefore, at the time $t_4$ on, the rich shift amount in the average air-fuel ratio control is made smaller than the lean shift amount. Due to this, at the time $t_4$ on, the time period during which the average air-fuel ratio correction amount AFCav is set to the rich set correction amount AFCrich (for example, times $t_6$ to $t_7$) becomes longer than the time period during which the average air-fuel ratio correction amount AFCav is set to the lean set correction amount AFClean (for example, times $t_5$ to $t_6$). That is, the time period during which the average air-fuel ratio becomes the rich air-fuel ratio also becomes longer than the time period in which it becomes the lean air-fuel ratio.

Further, as will be understood from FIG. 10, at the time $t_4$ on as well, inter-cylinder air-fuel ratio control is performed. In inter-cylinder air-fuel ratio control, at a rich side cylinder, the air-fuel ratio correction amount AFC is made the average air-fuel ratio correction amount AFCav minus the amount of change α, while at a lean side cylinder, the air-fuel ratio correction amount AFC is made the average air-fuel ratio /correction amount AFCav plus the amount of change α. The amount of change α is larger than the absolute value of the second rich set correction amount $AFCrich_2$ and the absolute value of the second lean set correction amount $AFClean_2$.

FIG. 11 is a time chart similar to FIG. 4 of the average air-fuel ratio correction amount AFCav etc. At the time $t_4$ on of FIG. 11, the temperature Tcat of the upstream side exhaust purification catalyst 20 becomes the switching temperature Tsw or more and the upper limit temperature Tlim or less. At this time, control similar to that of the time $t_4$ on of FIG. 10 is performed. Therefore, in average air-fuel ratio control, the average air-fuel ratio correction amount AFCav is alternately set to the second rich set correction amount $AFCrich_2$ and the second lean set correction amount $AFClean_2$. Further, in inter-cylinder air-fuel ratio control, air-fuel ratio correction amounts AFC of the cylinders are set so that the amount of change from the average air-fuel ratio correction amount AFCav becomes a.

On the other hand, in the example which is shown in FIG. 11, at the time $t_4$ on, the temperature Tcat of the upstream side exhaust purification catalyst 20 becomes the upper limit temperature Tlim or more. In the present embodiment, at this time, at average air-fuel ratio control, control similar to that before the time $t_4$ is performed. Therefore, the rich set correction amount AFCrich at the average air-fuel ratio control is set to the predetermined second rich set correction amount $AFCrich_2$, while the lean set correction amount AFClean is set to the predetermined second lean set correction amount $AFClean_2$. Therefore, the rich shift amount in the average air-fuel ratio control is made smaller than the lean shift amount.

In addition, at the time $t_4$ on, inter-cylinder air-fuel ratio control is stopped. In other words, the amount of change at inter-cylinder air-fuel ratio control is made zero. As a result, in all cylinders, the air-fuel ratio correction amounts AFC of the cylinders match the average air-fuel ratio correction amount AFCay. Accordingly, the combustion air-fuel ratios of the cylinders are controlled so that the combustion air-fuel ratios become equal at all cylinders.

Note that, the switching temperature is, for example, made a temperature (for example, 600° C.) such as where the sulfur content which is stored in the upstream side exhaust purification catalyst 20 starts to be desorbed if the temperature of the upstream side exhaust purification catalyst 20 becomes that or higher. Further, the upper limit temperature is, for example, made a temperature (for example, 800° C.) such as where the precious metal which is carried on the upstream side exhaust purification catalyst 20 sinters and the activity of the precious metal starts to fall if the temperature of the upstream side exhaust purification catalyst 20 becomes that or higher.

<Effects of Air-Fuel Ratio Control Based on Catalyst Temperature>

In this regard, as shown in FIG. 6C, in the state where exhaust gas of a rich air-fuel ratio is flowing into the upstream side exhaust purification catalyst 20, if the temperature of the upstream side exhaust purification catalyst 20 becomes a high temperature (for example, 600° C. or more), the sulfur content which is stored in the upstream side exhaust purification catalyst 20 starts to be desorbed. Therefore, to make the sulfur content be desorbed from the upstream side exhaust purification catalyst 20, or to prevent the sulfur content from being stored in the upstream side exhaust purification catalyst 20, exhaust gas of a rich air-fuel ratio has to flow into the upstream side exhaust purification catalyst 20 in the state where the temperature of the upstream side exhaust purification catalyst 20 is high in temperature.

As opposed to this, in the present embodiment, at the time $t_4$ on where the temperature of the upstream side exhaust purification catalyst 20 is the switching temperature or more, the rich shift amount in the average air-fuel ratio control is made smaller than the lean shift amount. For this reason, the time period during which the average air-fuel ratio becomes the rich air-fuel ratio becomes longer than the time period during which it becomes the lean air-fuel ratio. As a result, the sulfur content which is stored in the upstream side exhaust purification catalyst 20 becomes easy to be desorbed.

Further, the amount of desorption of the $SO_x$ or sulfur content from the upstream side exhaust purification catalyst 20 per unit time becomes greater the higher the temperature of the upstream side exhaust purification catalyst 20. In addition, the higher the temperature of the upstream side exhaust purification catalyst 20 becomes, the harder it is for the $SO_x$ or sulfur content to be stored in the upstream side exhaust purification catalyst 20. In relation to this, in the present embodiment, inter-cylinder air-fuel ratio control is continued even if the temperature of the upstream side exhaust purification catalyst 20 becomes the switching temperature or more. If performing inter-cylinder air-fuel ratio control, exhaust gas which contains unburned HC, CO, and oxygen flows into the upstream side exhaust purification catalyst 20. For this reason, at the upstream side exhaust purification catalyst 20, these unburned HC, CO, and oxygen react to generate heat. Due to this, the temperature of the upstream side exhaust purification catalyst 20 is raised. As a result, it is possible to increase the amount of desorption per unit time of the $SO_x$ or sulfur content which is stored in the upstream side exhaust purification catalyst 20 and, further, possible to suppress the storage of $SO_x$ or sulfur content in the upstream side exhaust purification catalyst 20.

In addition, if the temperature of the upstream side exhaust purification catalyst 20 becomes higher than the upper limit temperature, the higher the temperature becomes, the more the precious metal which is carried on the upstream side exhaust purification catalyst 20 is sintered and therefore the more the catalytic activity falls. As explained above, if performing inter-cylinder air-fuel ratio control, the temperature of the upstream side exhaust purification catalyst 20 rises. Therefore, if continuing the inter-cylinder air-fuel ratio control even if the temperature of the upstream side exhaust purification catalyst 20 becomes the upper limit temperature or more, a drop in the catalytic activity of the upstream side exhaust purification catalyst 20 is invited. As opposed to this, in the present embodiment, as explained above, if the temperature of the upstream side exhaust purification catalyst 20 becomes higher than the upper limit temperature as well, the inter-cylinder air-fuel ratio control is made to stop. For this reason, the upstream side exhaust purification catalyst 20 is kept from ending up becoming excessively raised in temperature.

Further, in the above embodiment, the amount of change α at the inter-cylinder air-fuel ratio control is maintained constant so long as the temperature of the upstream side exhaust purification catalyst 20 is the upper limit temperature Tlim or less. However, the amount of change α need not be maintained constant. For example, it may change based on the temperature of the upstream side exhaust purification catalyst 20 etc. In this case, for example, as the temperature of the upstream side exhaust purification catalyst 20 rises from the switching temperature Tsw toward the upper limit temperature Tlim, the amount of change α is made to fall.

<Flow Chart>

Figure 12:
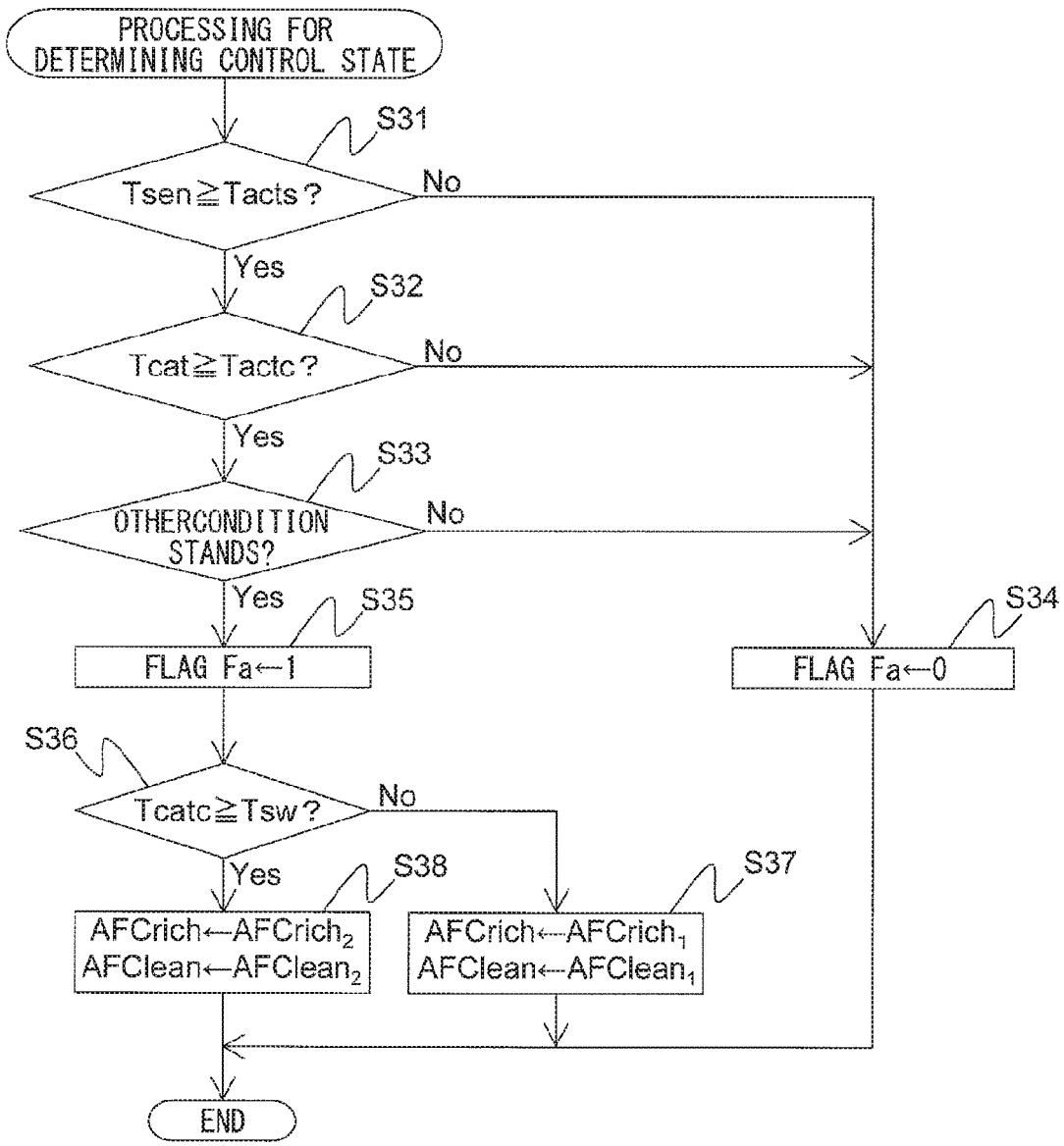
FIG. 12 is a flow chart which shows the control routine for processing for determining a control state of average air-fuel ratio control.

FIG. 12 is a flow chart which shows a control routine for processing for determining a control state of average air-fuel ratio control. The illustrated control routine is performed by interruption at certain time intervals.

First, at step S31, it is judged if the temperature Tsen of the air-fuel ratio sensors 40 and 41 is the activation temperature Tacts or more. The temperature of the air-fuel ratio sensors 40 and 41 is determined by detection of their impedances and by calculation based on the detected impedances. Further, at step S32, it is judged if the temperature Tcat of the upstream side exhaust purification catalyst 20 is the activation temperature Tactc or more. The temperature Tcat of the upstream side exhaust purification catalyst 20 is detected by the temperature sensor 46 or is calculated based on another parameter. In addition, at step S33, it is judged if another condition for execution besides these temperatures stands. As the other condition for execution, for example, whether control so that the air-fuel ratio of the exhaust gas which is discharged from the upstream side exhaust purification catalyst 20 becomes a rich air-fuel ratio, for example, control for increasing the fuel injection amount along with rapid increase of the engine load etc. may be mentioned.

If it is judged that the condition does not stand at any of the judgments of steps S31 to S33, the routine proceeds to step S34. At step S34, the average air-fuel ratio control execution flag Fα is reset to "0" and the control routine is made to end. The average air-fuel ratio control execution flag Fa is a flag which is set to "1" when the condition for execution of average air-fuel ratio control stands and is set to "0" when it does not stand. Therefore, if the average air-fuel ratio control execution flag Fa is set to "1", at step S11 of FIG. 11, it is judged that the condition for execution of average air-fuel ratio control stands.

On the other hand, if, at steps S31 to S33, it is judged that the temperature Tsen of the air-fuel ratio sensors 40 and 41 is the activation temperature Tacts or more, the temperature Tcat of the upstream side exhaust purification catalyst 20 is the activation temperature Tactc or more, and other conditions for execution also stand, the routine proceeds to step S35. At step S35, the average air-fuel ratio control execution flag Fa is set to "1".

Next, at step S36, it is judged if the detected or calculated temperature Tcat of the upstream side exhaust purification catalyst 20 is the predetermined switching temperature Tsw or more. If, at step S36, it is judged that the temperature Tcat of the upstream side exhaust purification catalyst 20 is less than the switching temperature Tsw, the routine proceeds to step S37. At step S37, the rich set correction amount AFCrich is set to a first rich set correction amount $AFCrich_1$, the lean set correction amount AFClean is set to the first lean set correction amount $AFClean_1$, and the control routine is made to end.

After that, if the temperature Tcat of the upstream side exhaust purification catalyst 20 rises, in the control routine after that, at step S36, it is judged that the temperature Tcat of the upstream side exhaust purification catalyst 20 is the switching temperature Tsw or more and the routine proceeds to step S38. At step S38, the rich set correction amount AFCrich is set to the second rich set correction amount $AFCrich_2$, the lean set correction amount AFClean is set to the second lean set correction amount $AFClean_2$, and the control routine is made to end.

Figure 13:
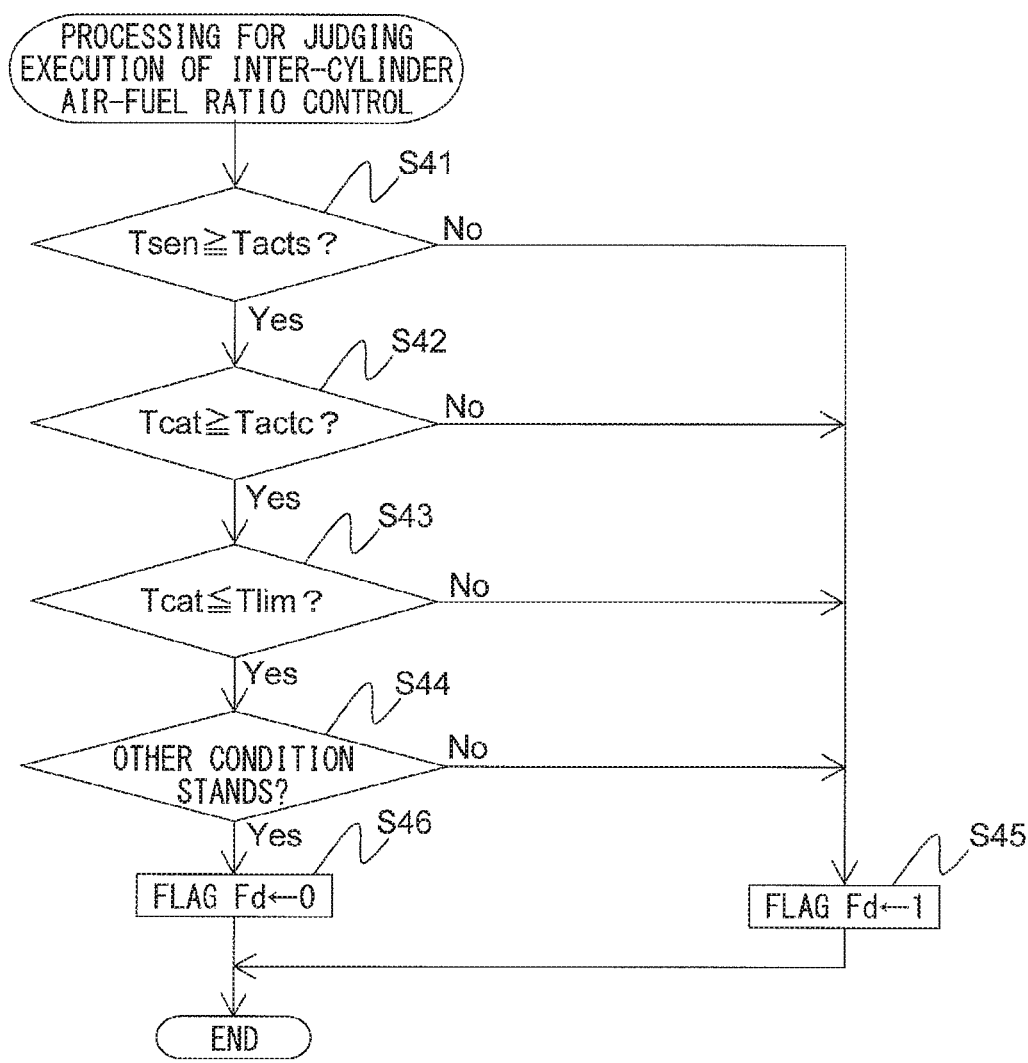
FIG. 13 is a flow chart which shows a control routine of processing for judgment of execution of inter-cylinder air-fuel ratio control.

FIG. 13 is a flow chart which shows a control routine of processing for judgment if the condition for execution of inter-cylinder air-fuel ratio control stands. The illustrated control routine is performed by interruption at certain time intervals.

Steps S41, S42, and S44 are similar to steps S31 to S33 of FIG. 12, therefore explanations will be omitted. In the present control routine, it is judged if the temperature Tcat of the upstream side exhaust purification catalyst 20 is the upper limit temperature Tlim or less. Further, if, at step S43, the temperature Tcat of the upstream side exhaust purification catalyst 20 is higher than the upper limit temperature Tlim, the routine proceeds to step S45. At step S45, the inter-cylinder air-fuel ratio control execution flag Fd is reset to "0", then the control routine is made to end. The inter-cylinder air-fuel ratio control execution flag Fd is a flag which is set to "1" when the condition for execution of the inter-cylinder air-fuel ratio control stands and is set to "0" when it does not stand.

On the other hand, when at step S43 it is judged that the temperature Tcat of the upstream side exhaust purification catalyst 20 is the upper limit temperature Tlim or less, the routine proceeds to step S46 if the judgments at steps S41, S42, and S44 all stand. At step S46, the inter-cylinder air-fuel ratio control execution flag Fd is set to "1".

Modification of First Embodiment

Next, referring to FIG. 14 and FIG. 14, a modification of the exhaust purification system of the first embodiment of the present invention will be explained. In the inter-cylinder air-fuel ratio control of the above-mentioned first embodiment, both when the average air-fuel ratio correction amount AFCav is set to the rich set correction amount AFCrich and when it is set to the lean set correction amount AFClean, the combustion air-fuel ratio is made to change between cylinders.

However, if the combustion air-fuel ratio is made to change between cylinders when the average air-fuel ratio correction amount AFCav is set to the rich set correction amount AFCrich, the air-fuel ratio correction amount AFC of the rich side cylinder becomes the rich set correction amount AFCrich minus the amount of change α. For this reason, the combustion air-fuel ratio at the rich side cylinder becomes a rich air-fuel ratio of a large rich degree. If the rich degree becomes higher in this way, as explained above, even if $SO_x$ has been firmly stored in the oxygen storing substance, separation of $SO_x$ is invited and the sulfur content ends up moving to the precious metal surface.

Figure 14:
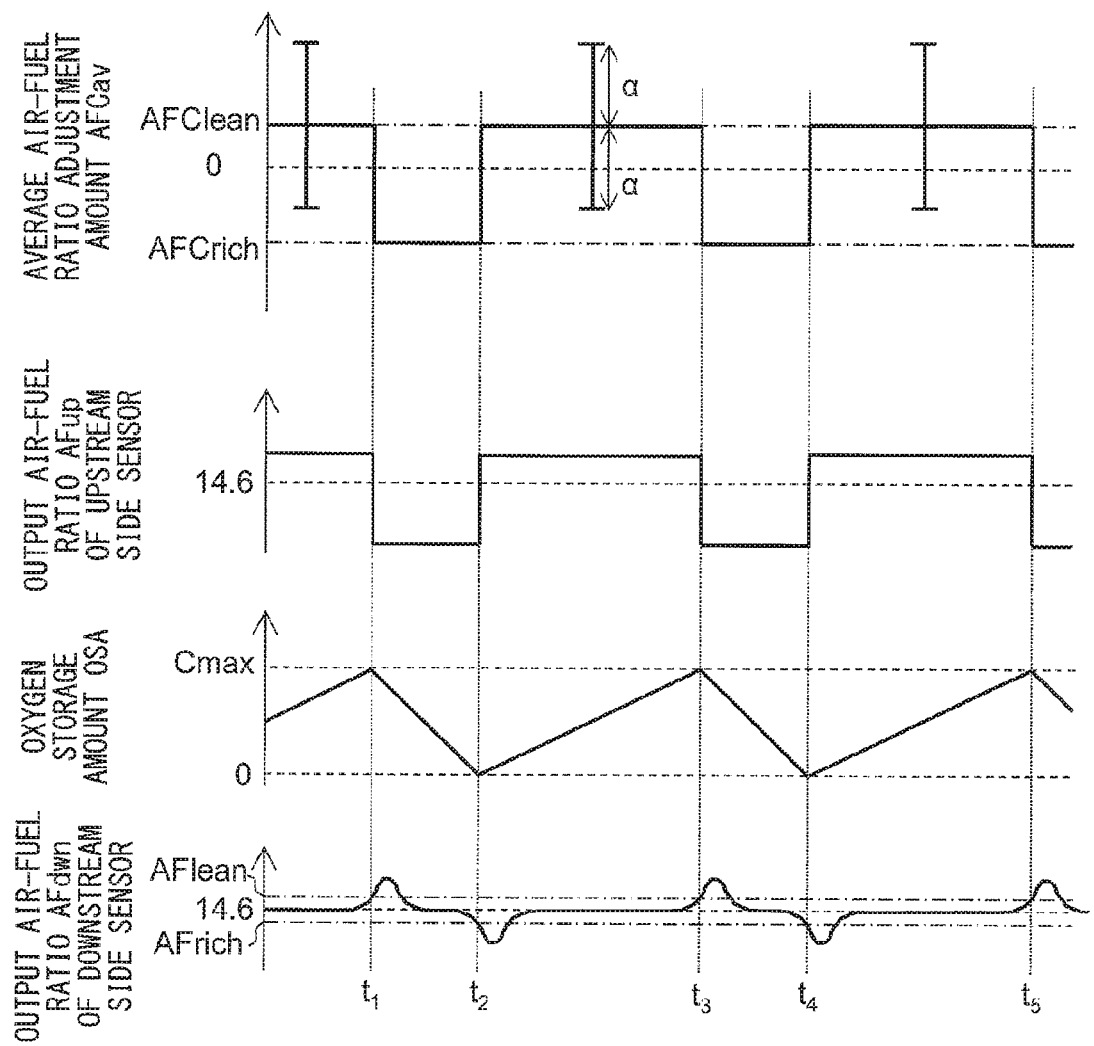
FIG. 14 is a time chart of an average air-fuel ratio correction amount etc.

Therefore, in this modification, as shown in FIG. 14, inter-cylinder air-fuel ratio control is performed when the average air-fuel ratio is made the lean air-fuel ratio. In addition, when the average air-fuel ratio is made the rich air-fuel ratio, inter-cylinder air-fuel ratio control is not performed and the combustion air-fuel ratios of the cylinders are controlled so that the combustion air-fuel ratios become rich air-fuel ratios at all cylinders. Due to this, even when the average air-fuel ratio is made the rich air-fuel ratio, the combustion air-fuel ratios of the cylinders are kept from becoming rich with a large rich degree and accordingly movement of sulfur content from the oxygen storing substance to the precious metal surface can be suppressed.

Figure 15:
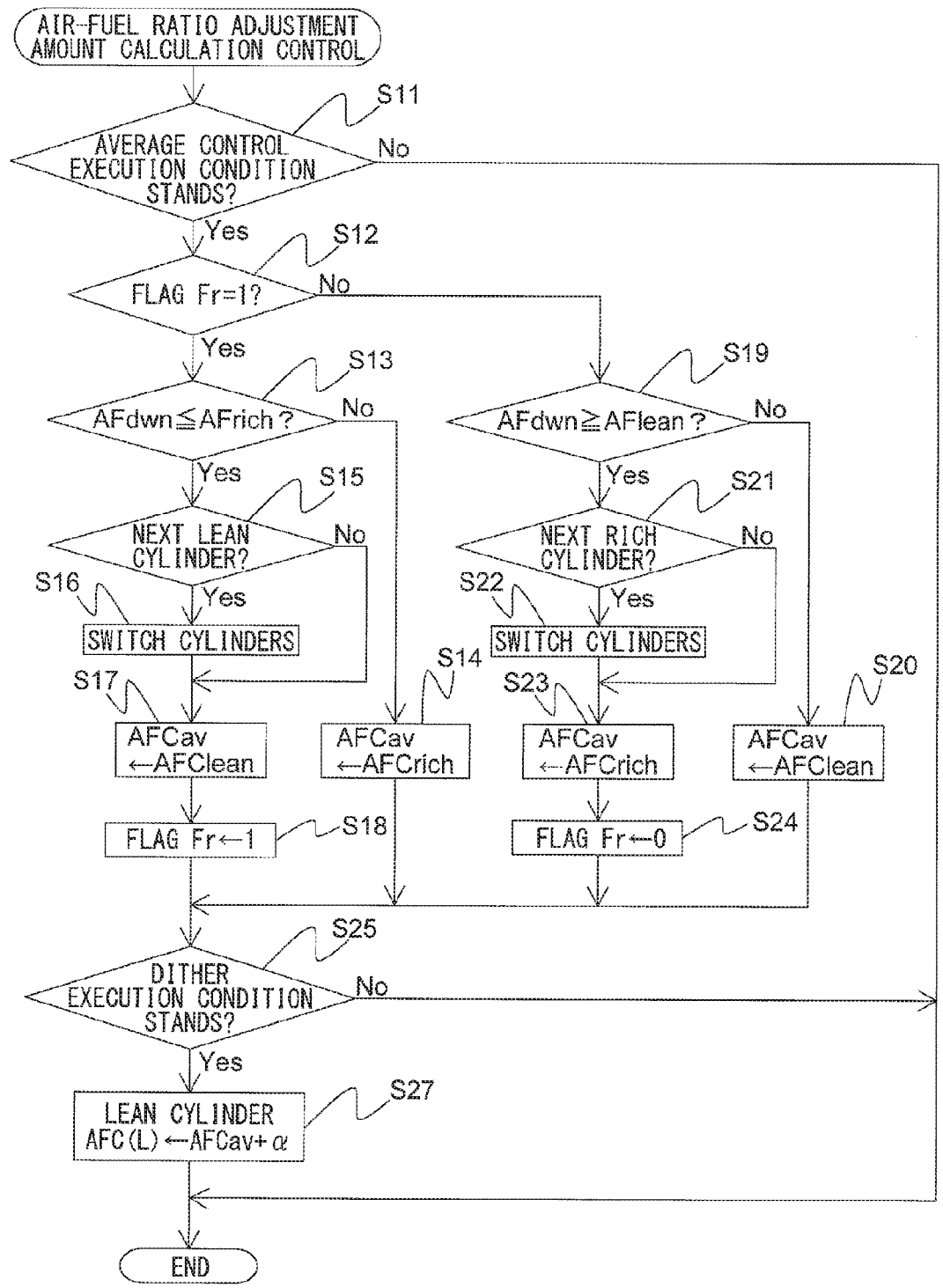
FIG. 15 is a flow chart which shows a control routine of processing for calculating an air-fuel ratio correction amount in a modification of the first embodiment.

FIG. 15 is a flow chart which shows a control routine of processing for calculating an air-fuel ratio correction amount in the present modification. The control routine which is shown in FIG. 15 is similar to the control routine which is shown in FIG. 9 except for the point of the deletion of step S26 of FIG. 9.

Second Embodiment

Next, referring to FIG. 16 and FIG. 17, an exhaust purification system of a second embodiment of the present invention will be explained. The configuration and control of the exhaust purification system according to the second embodiment are, except for the points which are explained below, basically similar to the configuration and control of the exhaust purification system according to the first embodiment.

In the first embodiment, when the temperature Tcat of the upstream side exhaust purification catalyst 20 is the switching temperature Tsw to the upper limit temperature, the temperature Tcat of the upstream side exhaust purification catalyst 20 is maintained high by performing inter-cylinder air-fuel ratio control. However, there are also other methods for maintaining the temperature Tcat of the upstream side exhaust purification catalyst 20 high. Therefore, in the present embodiment, when the temperature Tcat of the upstream side exhaust purification catalyst 20 is the switching temperature Tsw or more, inter-cylinder air-fuel ratio control is not performed. The combustion air-fuel ratios of the cylinders are controlled so that the combustion air-fuel ratios become equal at all cylinders. In addition, in the present embodiment, when the temperature Tcat of the upstream side exhaust purification catalyst 20 is the switching temperature Tsw to the upper limit temperature Tlim or less, different control from inter-cylinder air-fuel ratio control is performed for maintaining the temperature Tcat of the upstream side exhaust purification catalyst 20 at a high temperature (below, referred to as "high temperature maintaining control").

Note that, in the present embodiment, the switching temperature which switches between performing and stopping inter-cylinder air-fuel ratio control and the switching temperature which reverses the sizes of the rich shift amount and lean shift amount in the average air-fuel ratio control are made the same. However, the switching temperature which switches between performing and stopping inter-cylinder air-fuel ratio control (first switching temperature) and the switching temperature which reverses the sizes the rich shift amount and lean shift amount in the average air-fuel ratio control (second switching temperature) may be made different temperatures.

Figure 16:
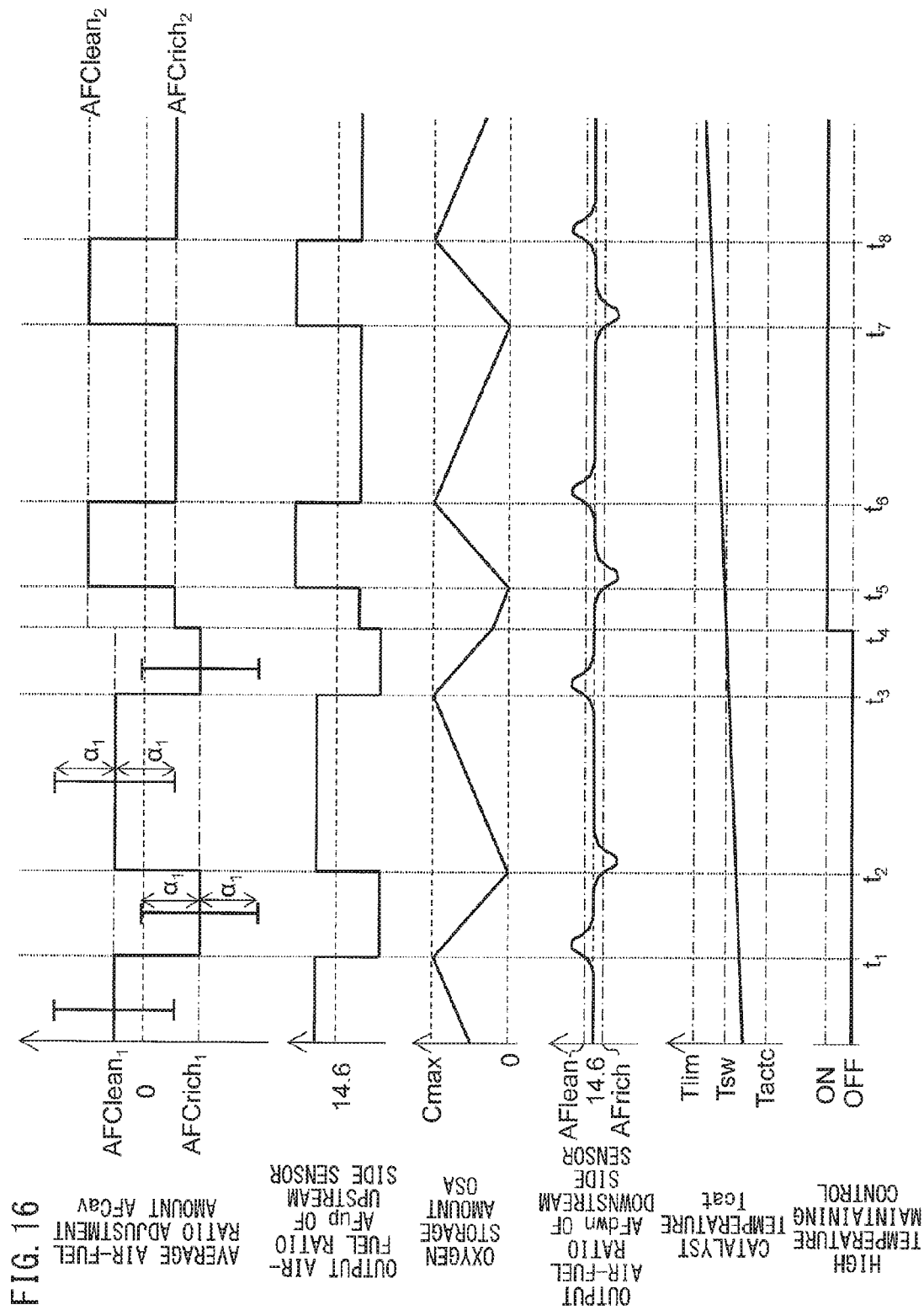
FIG. 16 is a time chart of an average air-fuel ratio correction amount etc.

Referring to FIG. 16, the average air-fuel ratio control and inter-cylinder air-fuel ratio control in the present embodiment will be specifically explained. FIG. 16 is a time chart similar to FIG. 10 of the average air-fuel ratio correction amount AFCav etc.

In the example which is shown in FIG. 10, before the time $t_4$, the temperature Tcat of the upstream side exhaust purification catalyst 20 becomes the activation temperature Tactc to less than the switching temperature Tsw. At this time, control similar to that before the time $t_4$ of FIG. 10 is performed. Note that, at this time, high temperature maintaining control is not being performed. Note that, as the high temperature maintaining control for maintaining the temperature Tcat of the upstream side exhaust purification catalyst 20 at a high temperature, ignition retardation control which retards the ignition timing by the spark plug 10 may be mentioned. Due to this, the temperature of the exhaust gas which is discharged from the engine body 1 rises and along with this the temperature Tcat of the upstream side exhaust purification catalyst 20 is maintained at a high temperature. Alternatively, in an internal combustion engine which is provided with an exhaust gas recirculation (EGR) mechanism (not shown) which returns part of the exhaust gas which is discharged from the engine body 1 to the inside of the intake passage, decreasing the amount of exhaust gas which is returned to inside the intake passage may be mentioned. Due to this as well, the temperature of the exhaust gas which is discharged from the engine body 1 rises, therefore the temperature of the upstream side exhaust purification catalyst 20 can be maintained at a high temperature. Note that, the high temperature maintaining control is not limited to the above-mentioned control. So long as control which can maintain the upstream side exhaust purification catalyst 20 at a high temperature of the switching temperature Tsw or more, any control can be performed.

On the other hand, in the example which is shown in FIG. 16, at the time $t_4$ on, the temperature Tcat of the upstream side exhaust purification catalyst 20 becomes the switching temperature Tsw or more. In the present embodiment, at this time, in the same way as the first embodiment, the rich set correction amount AFCrich in the average air-fuel ratio control is set to a predetermined second rich set correction amount AFCrich$_2$, while the lean set correction amount AFClean is set to a predetermined second lean set correction amount AFClean$_2$. Therefore, at this time, the rich shift amount in the average air-fuel ratio control is made smaller than the lean shift amount.

In addition, as will be understood from FIG. 16, in the present embodiment, at the time $t_4$ on, inter-cylinder air-fuel ratio control is made to stop. In other words, the amount of change in the inter-cylinder air-fuel ratio control is made zero. As a result, in all cylinders, the air-fuel ratio correction amounts AFC of the cylinders match the average air-fuel ratio correction amount AFCay. Accordingly, the combustion air-fuel ratios of the cylinders are controlled so that the combustion air-fuel ratios become equal at all cylinders.

Furthermore, in the present embodiment, at the time $t_4$ on, high temperature maintaining control is performed for maintaining the temperature Tcat of the upstream side exhaust purification catalyst 20 at a high temperature. Specifically, for example, at the time $t_4$ on, the ignition timing by the spark plug 10 is made to advance compared with before the time $t_4$. In the present embodiment, at the time $t_4$ on, a constant high temperature maintaining control is performed. Therefore, for example, when retarding the ignition timing as high temperature maintaining control, at the time $t_4$ on, regardless of the temperature Tcat of the upstream side exhaust purification catalyst 20 etc., the ignition timing is retarded by a substantially constant retardation angle at all times.

In the present embodiment as well, when the temperature Tcat of the upstream side exhaust purification catalyst 20 is the switching temperature Tsw or more, the rich shift amount in the average air-fuel ratio control is made smaller than the lean shift amount. For this reason, the sulfur content which is stored in the upstream side exhaust purification catalyst 20 becomes easy to be desorbed. Further, the temperature Tcat of the upstream side exhaust purification catalyst 20 is raised by the high temperature maintaining control. As a result, in the present embodiment as well, the amount of desorption per unit time of the $SO_x$ or sulfur content which is stored in the upstream side exhaust purification catalyst 20 can be made to increase. Further, the storage of $SO_x$ or sulfur content in the upstream side exhaust purification catalyst 20 can be suppressed.

Note that, in the above embodiment, at the time $t_4$ on, regardless of the temperature Tcat of the upstream side exhaust purification catalyst 20, constant high temperature maintaining control is performed. However, the amount of heating of the upstream side exhaust purification catalyst 20 by the high temperature maintaining control may be made to change in accordance with the temperature Tcat of the upstream side exhaust purification catalyst 20. Specifically, the higher the temperature Tcat of the upstream side exhaust purification catalyst 20, the more the amount of heating by the high temperature maintaining control can be decreased. Therefore, for example, when retarding the ignition timing as high temperature maintaining control, the higher the temperature Tcat of the upstream side exhaust purification catalyst 20, the more the ignition timing is shifted to the advanced side.

Figure 17:
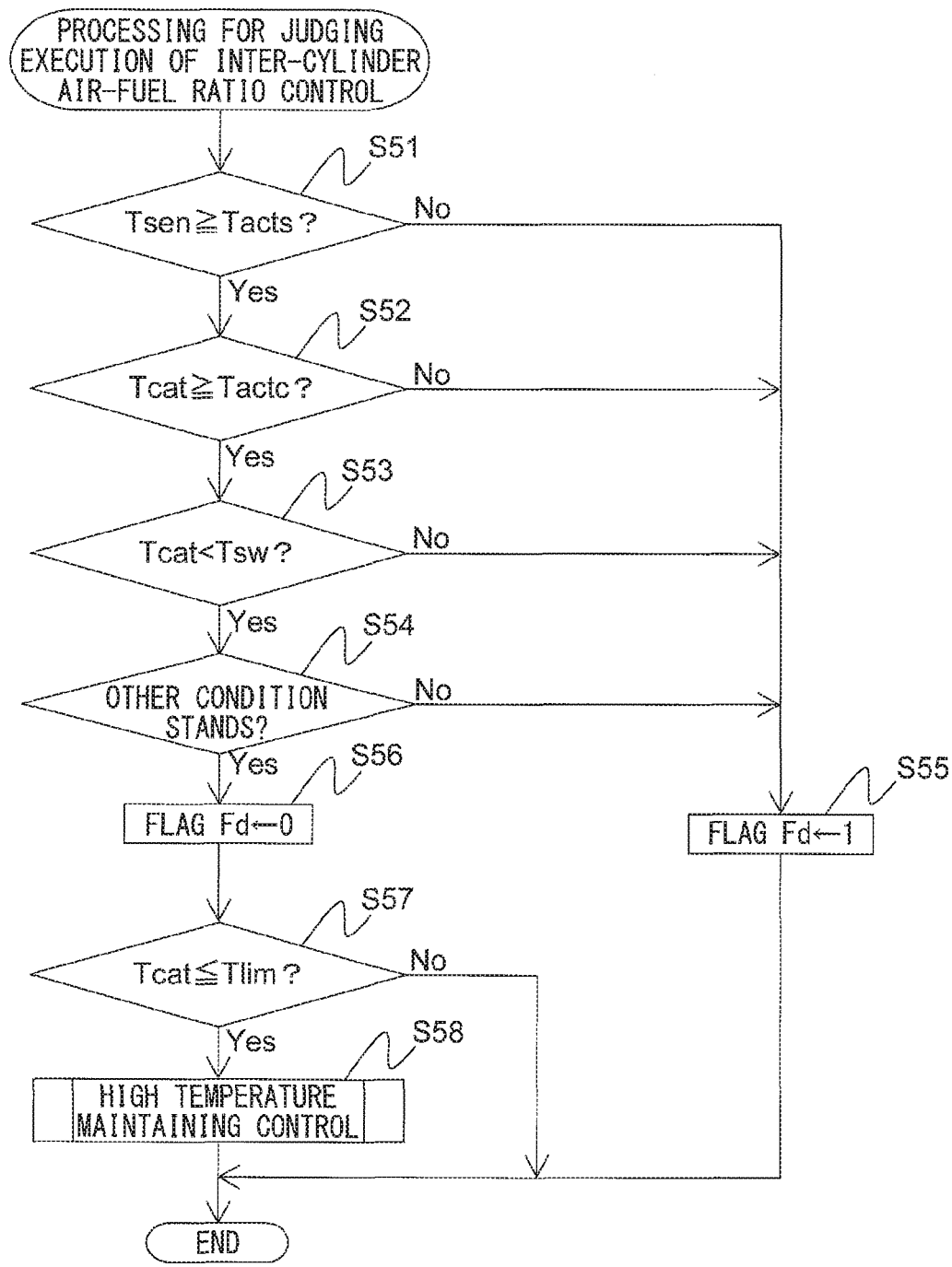
FIG. 17 is a flow chart which shows a control routine of processing for judgment of execution of average air-fuel ratio control.

FIG. 17 is a flow chart which shows the control routine in processing for judging whether the condition for execution of inter-cylinder air-fuel ratio control stands and the processing for execution of high temperature maintaining control. The illustrated control routine is performed by interruption at certain time intervals.

Steps S51, S52, and S54 are similar to steps S41, S42, and S44 of FIG. 13, therefore explanations will be omitted. In the present control routine, at step S53, it is judged if the temperature Tcat of the upstream side exhaust purification catalyst 20 is less than the switching temperature Tsw. Further, when it is judged, at step S53, that the temperature Tcat of the upstream side exhaust purification catalyst 20 is the switching temperature Tsw or more, the routine proceeds to step S55. At step S55, the inter-cylinder air-fuel ratio control execution flag Fd is reset to "0", and the control routine is made to end.

On the other hand, when, at step S53, it is judged that the temperature Tcat of the upstream side exhaust purification catalyst 20 is less than the switching temperature Tsw, if all the judgments of steps S51, S52, and S54 stand, the routine proceeds to step S56. At step S56, inter-cylinder air-fuel ratio control execution flag Fd is set to "1". Next, at step S57, it is judged if the temperature Tcat of the upstream side exhaust purification catalyst 20 is less than the upper limit temperature Tlim. If it is judged that the temperature Tcat of the upstream side exhaust purification catalyst 20 is the upper limit temperature Tlim or more, the control routine is made to end. On the other hand, if it is judged that the temperature Tcat of the upstream side exhaust purification catalyst 20 is less than upper limit temperature Tlim, the routine proceeds to step S58. At step S58, the high temperature maintaining control is executed, and the control routine is made to end.

Third Embodiment

Next, referring to FIG. 18 to FIG. 20, an exhaust purification system of a third embodiment of the present invention will be explained. The configuration and control of the exhaust purification system according to the third embodiment are, except for the points which are explained below, basically similar to the configuration and control of the exhaust purification system according to the first embodiment and the second embodiment.

In the average air-fuel ratio control of the present embodiment, first, if, in the state where the target average air-fuel ratio is set to the rich set air-fuel ratio, it is judged that the output air-fuel ratio of the downstream side air-fuel ratio sensor 41 has become the rich air-fuel ratio, the target average air-fuel ratio is switched to the lean set air-fuel ratio. Due to this, the average air-fuel ratio changes to the lean air-fuel ratio.

If the target average air-fuel ratio is switched to the lean set air-fuel ratio, the oxygen excess/deficiency of the exhaust gas which flows into the upstream side exhaust purification catalyst 20 is cumulatively added. The "oxygen excess/deficiency" means the amount of oxygen which becomes in excess or the amount of oxygen which becomes deficient when trying to make the air-fuel ratio of the exhaust gas which flows into the upstream side exhaust purification catalyst 20 the stoichiometric air-fuel ratio (amount of excess unburned gas etc.) In particular, when the target average air-fuel ratio becomes the lean set air-fuel ratio, the oxygen in the exhaust gas which flows into the upstream side exhaust purification catalyst 20 becomes excessive. This excess oxygen is stored in the upstream side exhaust purification catalyst 20. Therefore, it can be said that the cumulative amount of the oxygen excess/deficiency (below, referred to as the "cumulative oxygen excess/deficiency") expresses the oxygen storage amount OSA of the upstream side exhaust purification catalyst 20.

Note that, the oxygen excess/deficiency is calculated based on the output air-fuel ratio of the upstream side air-fuel ratio sensor 40 and the flow rate of the exhaust gas which flows through the upstream side exhaust purification catalyst 20 or the fuel feed amount from the fuel injector 11 etc. Specifically, the oxygen excess/deficiency OED in the exhaust gas which flows into the upstream side exhaust purification catalyst 20 is, for example, calculated from the following formula (2):

$$OED = 0.23 \times Qi \times (AFup - AFR) \quad (2)$$

Here, 0.23 is the concentration of oxygen in the air, Qi is the fuel injection amount, AFup is the output air-fuel ratio of the upstream side air-fuel ratio sensor 40, and AFR is the air-fuel ratio becoming the control center (in the present embodiment, stoichiometric air-fuel ratio).

If the cumulative oxygen excess/deficiency which is obtained by cumulatively adding the thus calculated oxygen excess/deficiency becomes a predetermined switching reference value (corresponding to predetermined switching reference storage amount Cref) or more, the target average air-fuel ratio which had been set to the lean set air-fuel ratio up to then is switched to the rich set air-fuel ratio. That is, when the oxygen storage amount OSA of the upstream side exhaust purification catalyst 20 from which starting to control the average air-fuel ratio to the lean air-fuel ratio reaches a predetermined switching reference storage amount Cref, the average air-fuel ratio is switched to the rich air-fuel ratio.

After that, when the output air-fuel ratio of the downstream side air-fuel ratio sensor 41 again becomes the rich judged air-fuel ratio or less, the target average air-fuel ratio is again made the lean set air-fuel ratio then after that a similar procedure is repeated. In this way, in the present embodiment as well, the target average air-fuel ratio of the exhaust gas which flows into the upstream side exhaust purification catalyst 20 is alternately set to the lean set air-fuel ratio and the rich set air-fuel ratio.

Figure 18:
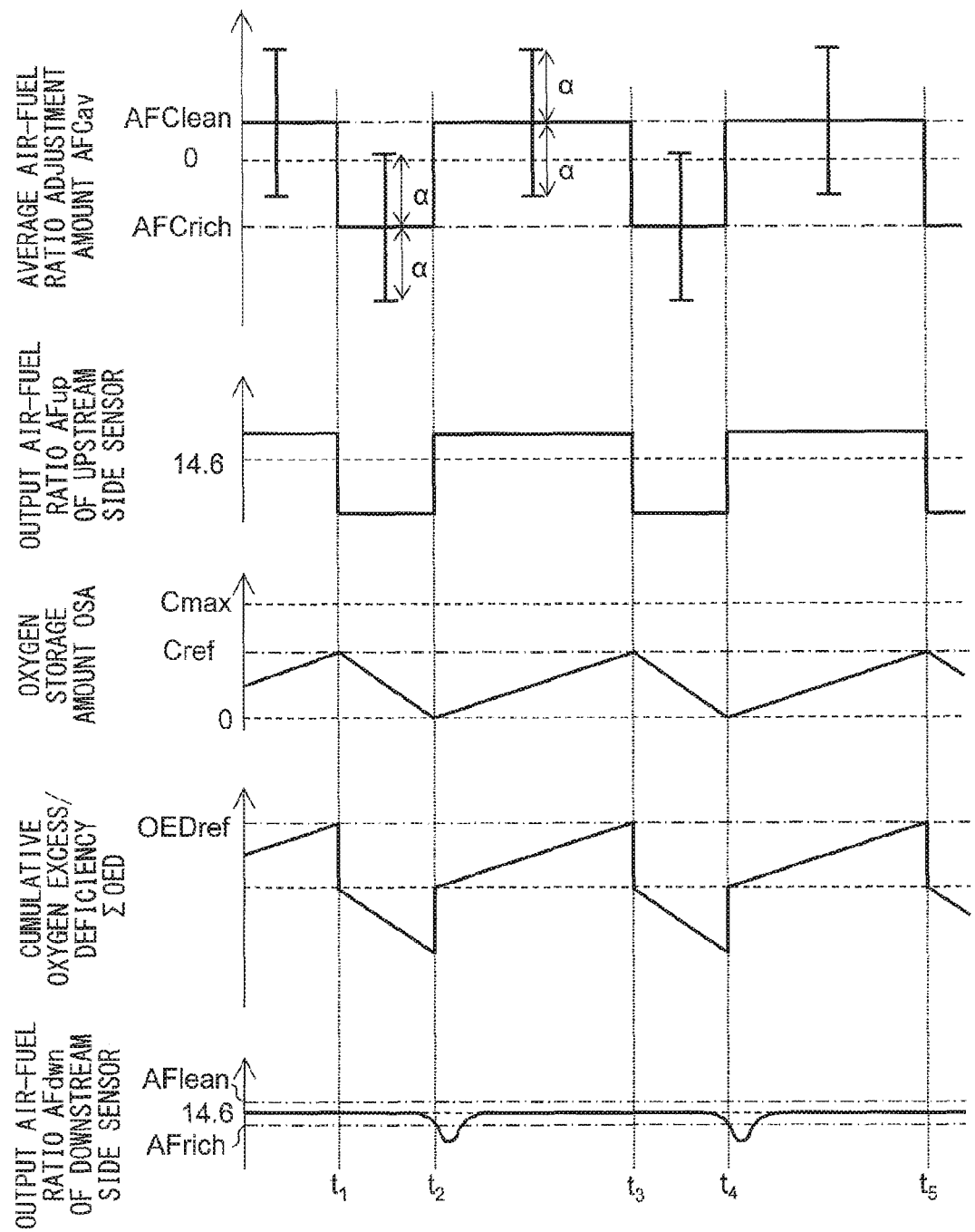
FIG. 18 is a time chart of an average air-fuel ratio correction amount etc.

Referring to FIG. 18, the average air-fuel ratio control of the present embodiment will be specifically explained. FIG. 18 is a time chart, similar to FIG. 4, of the average air-fuel ratio correction amount AFCav etc. In the example which is shown in FIG. 18, at the times $t_1$ to $t_2$, the average air-fuel ratio correction amount AFCav is set to the rich set correction amount AFCrich. That is, the target average air-fuel ratio is made a rich air-fuel ratio. Along with this, the output air-fuel ratio AFup of the upstream side air-fuel ratio sensor 40 becomes a rich air-fuel ratio. The unburned HC and CO which are contained in the exhaust gas which flows into the upstream side exhaust purification catalyst 20 are removed by the upstream side exhaust purification catalyst 20. Along with this, the oxygen storage amount OSA of the upstream side exhaust purification catalyst 20 is gradually decreased. On the other hand, due to the action of removal of unburned HC and CO in the upstream side exhaust purification catalyst 20, the output air-fuel ratio AFdwn of the downstream side air-fuel ratio sensor 41 becomes the substantially stoichiometric air-fuel ratio.

After that, if the oxygen storage amount OSA of the upstream side exhaust purification catalyst 20 decreases and approaches zero, part of the unburned HC and CO which flow into the upstream side exhaust purification catalyst 20 starts to flow out from the upstream side exhaust purification catalyst 20. For this reason, in the illustrated example, at the time $t_2$, the output air-fuel ratio AFdwn of the downstream side air-fuel ratio sensor 41 reaches the rich judged air-fuel ratio AFrich.

In the present embodiment, if the output air-fuel ratio AFdwn of the downstream side air-fuel ratio sensor 41 becomes the rich judged air-fuel ratio AFrich or less, to make the oxygen storage amount OSA increase, the average air-fuel ratio correction amount AFCav is switched to the lean set correction amount AFClean. Therefore, the target average air-fuel ratio is switched to the lean air-fuel ratio. At this time, the cumulative oxygen excess/deficiency ΣOED is reset to zero.

At the time $t_2$, if the average air-fuel ratio correction amount AFCav is switched to the lean set correction amount AFClean, the air-fuel ratio of the exhaust gas which flows into the upstream side exhaust purification catalyst 20 changes from the rich air-fuel ratio to the lean air-fuel ratio. Further, along with this, the output air-fuel ratio AFup of the upstream side air-fuel ratio sensor 40 becomes the lean air-fuel ratio. In addition, at the time $t_2$ on, the oxygen storage amount OSA of the upstream side exhaust purification catalyst 20 gradually increases and further the cumulative oxygen excess/deficiency ΣOED also gradually increases. Further, the output air-fuel ratio AFdwn of the downstream side air-fuel ratio sensor 41 converges to the stoichiometric air-fuel ratio.

After that, if the oxygen storage amount OSA of the upstream side exhaust purification catalyst 20 increases, at the time $t_3$, the oxygen storage amount OSA of the upstream side exhaust purification catalyst 20 reaches the switching reference storage amount Cref. At this time, the cumulative oxygen excess/deficiency ΣOED reaches a switching reference value OEDref which corresponds to the switching reference storage amount Cref. In the present embodiment, if the cumulative oxygen excess/deficiency ΣOED becomes the switching reference value OEDref or more, the storage of oxygen in the upstream side exhaust purification catalyst 20 is stopped by the average air-fuel ratio correction amount AFCav being switched to the rich set correction amount AFCrich. Therefore, the target average air-fuel ratio is made the rich air-fuel ratio. Further, at this time, the cumulative oxygen excess/deficiency ΣOED is reset to zero. After that, in average air-fuel ratio control, the control of the times $t_1$ to $t_3$ is repeated.

Note that, the switching reference storage amount Cref is set sufficiently lower than the maximum storable oxygen amount Cmax when the upstream side exhaust purification catalyst 20 is unused. For this reason, even if the actual air-fuel ratio of the exhaust gas unintentionally greatly deviates from the target average air-fuel ratio for an instant, the oxygen storage amount OSA will not reach the maximum storable oxygen amount Cmax. Conversely speaking, the switching reference storage amount Cref is made a sufficiently small amount so that even if the above-mentioned such unintended deviation of the air-fuel ratio occurs, the oxygen storage amount OSA will not reach the maximum storable oxygen amount Cmax. For example, the switching reference storage amount Cref is made ¾ or less of the maximum storable oxygen amount Cmax of when the upstream side exhaust purification catalyst 20 is unused, preferably ½ or less, more preferably ⅕ or less.

According to the present embodiment, before oxygen or $NO_x$ flows out from the upstream side exhaust purification catalyst 20, the target average air-fuel ratio is switched from the lean air-fuel ratio to the rich air-fuel ratio. For this reason, it is possible to constantly suppress the amount of discharge of $NO_x$ from the upstream side exhaust purification catalyst 20. That is, so long as performing the above-mentioned control, basically the amount of discharge of $NO_x$ from the upstream side exhaust purification catalyst 20 can be made substantially zero. Further, the cumulative time when calculating the cumulative oxygen excess/deficiency ΣOED is short, therefore compared with when cumulatively adding it over a long period of time, there is greater resistance to calculation error. For this reason, error in calculation of the cumulative oxygen excess/deficiency ΣOED can be kept from causing $NO_x$ to end up being discharged.

Note that, in the present embodiment, even in the time period when the average air-fuel ratio correction amount AFCav is set to the rich set correction amount AFCrich (for example, times $t_1$ to $t_2$) and even in the time period in which it is set to the lean set correction amount AFClean (for example, times $t_2$ to $t_3$), inter-cylinder air-fuel ratio control is performed. In particular, in the example which is shown in FIG. 19, at the rich side cylinder, the air-fuel ratio correction amount AFC is set to an average air-fuel ratio correction amount AFCav minus the amount of change α. On the other hand, at the lean side cylinder, the air-fuel ratio correction amount AFC is set to the average air-fuel ratio correction amount AFCav plus the amount of change α. However, in the same way as the modification of the above-mentioned first embodiment, it is also possible to not perform the inter-cylinder air-fuel ratio control in the time period during which the average air-fuel ratio correction amount AFCav is set to the rich set correction amount.

<Specific Explanation and Flow Chart of Control>

Figure 19:
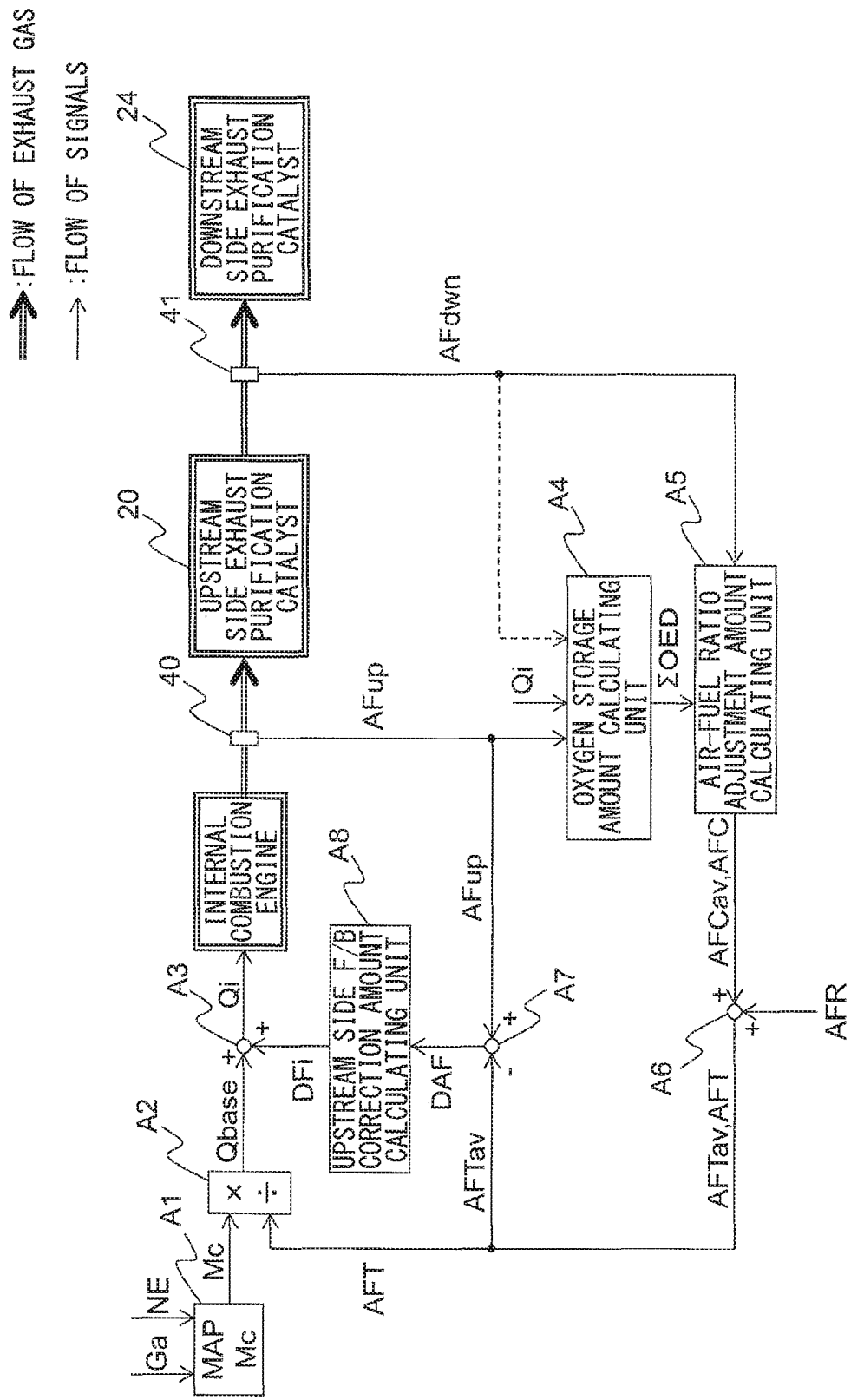
FIG. 19 is a functional block diagram of a control device.

Next, referring to FIG. 19, a control device of an exhaust purification system in the above embodiment will be specifically explained. FIG. 19 is a functional block diagram similar to FIG. 8. It comprises the functional block diagram which is shown in FIG. 8 plus the oxygen excess/deficiency calculating unit A4.

The oxygen excess/deficiency calculating unit A4 uses the fuel injection amount Qi which was calculated by the fuel injection amount calculating unit A3 and the output air-fuel ratio AFup of the upstream side air-fuel ratio sensor 40 as the basis to calculate the cumulative oxygen excess/deficiency ΣOED. The oxygen excess/deficiency calculating unit A4, for example, uses the above formula (2) to multiply the difference between the output air-fuel ratio of the upstream side air-fuel ratio sensor 40 and the control center air-fuel ratio with the fuel injection amount Qi and cumulatively adds the found values to calculate the cumulative oxygen excess/deficiency ΣOED. Further, in the present embodiment, the air-fuel ratio correction amount calculating unit A5 uses the output air-fuel ratio AFdwn of the downstream side air-fuel ratio sensor 41 plus the cumulative oxygen excess/deficiency ΣOED which is calculated by the oxygen excess/deficiency calculating unit A4 as the basis to calculate the average air-fuel ratio correction amount AFCav and the air-fuel ratio correction amounts AFC of the cylinders.

Figure 20:
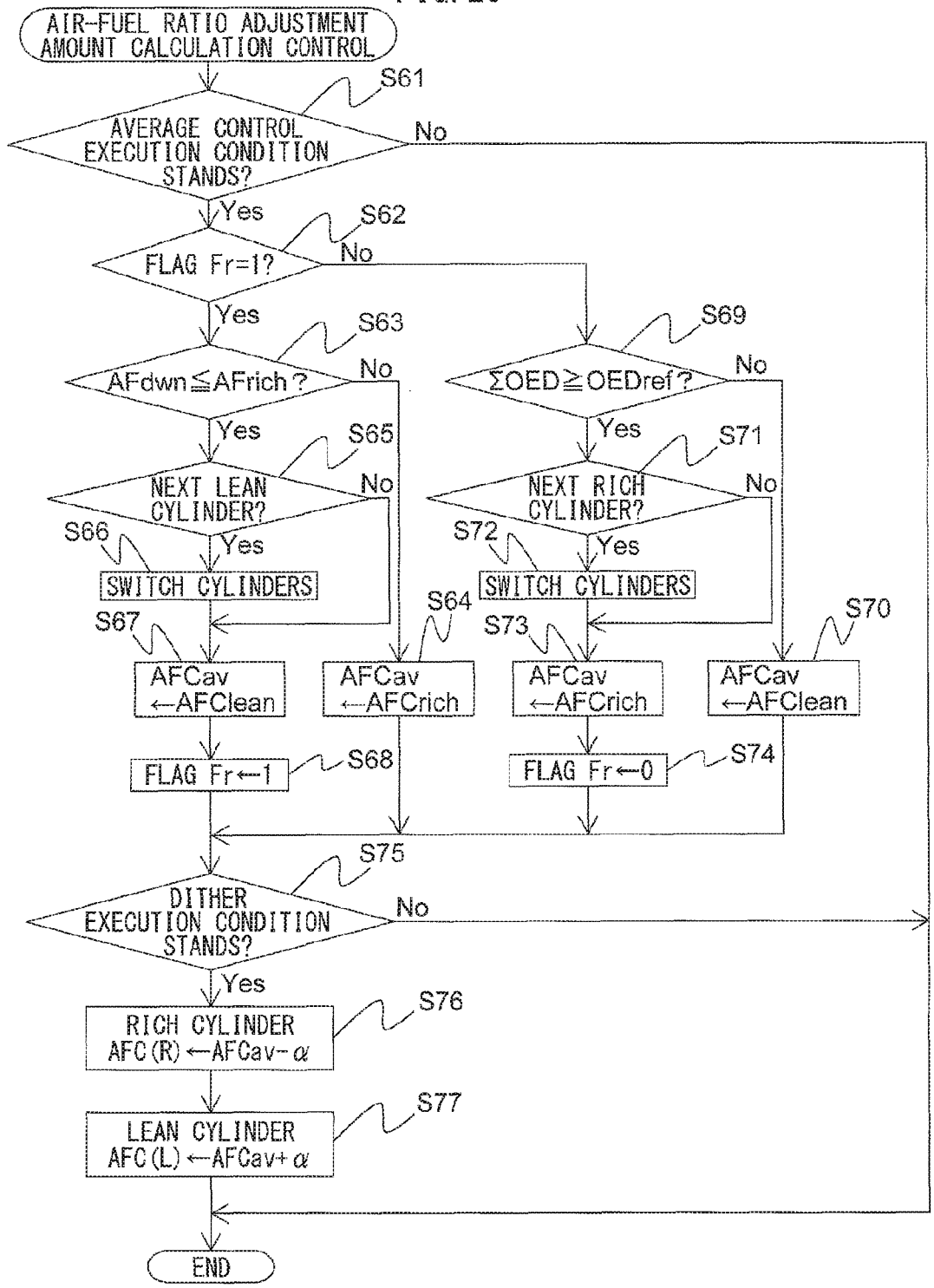
FIG. 20 is a time chart of an average air-fuel ratio correction amount etc.

FIG. 20 is a flow chart which shows a control routine of processing for calculating an air-fuel ratio correction amount in a third embodiment. The illustrated control routine is performed by interruption at certain time intervals. Steps S61 to S68 and steps S70 to S77 of FIG. 20 are similar to steps S11 to S18 and steps S20 to S27 of FIG. 9, therefore explanations will be omitted.

In the control routine which is shown in FIG. 20, when it is judged at step S62 that the rich flag Fr is not "1", the routine proceeds to step S69. At step S69, it is judged if the cumulative oxygen excess/deficiency ΣOED from when the average air-fuel ratio correction amount AFCav is switched is the switching reference value OEDref or more. If the cumulative oxygen excess/deficiency ΣOED is smaller than the switching reference value OEDref, the routine proceeds to step S70. On the other hand, if it is judged that the cumulative oxygen excess/deficiency ΣOED is the switching reference value OEDref or more, the routine proceeds to step S71.

Although this invention has been described by way of the specific embodiments, this invention is not limited to the above embodiments. It is possible for a person skilled in the art to modify or alter the above embodiments in various manners within the technical scope of the present invention.

What is claimed is:

1. An exhaust purification system of an internal combustion engine which has a plurality of cylinders comprising:
    an exhaust purification catalyst which is arranged in an engine exhaust passage and which can store oxygen;
    a downstream side air-fuel ratio sensor which is arranged at a downstream side of the exhaust purification catalyst in a direction of flow of exhaust; and
    a control device to control an average air-fuel ratio of exhaust gas which flows into the exhaust purification catalyst and combustion air-fuel ratios when combustion is performed in the cylinders, wherein the control device is configured to:

perform average air-fuel ratio control which alternately controls the average air-fuel ratio between a rich air-fuel ratio which is richer than a stoichiometric air-fuel ratio and a lean air-fuel ratio which is leaner than the stoichiometric air-fuel ratio;

perform inter-cylinder air-fuel ratio control which controls the combustion air-fuel ratios of the cylinders so that the combustion air-fuel ratio becomes the rich air-fuel ratio at least at one cylinder among the plurality of cylinders including if the average air-fuel ratio is controlled to the lean air-fuel ratio by the average air-fuel ratio control when the temperature of the exhaust purification catalyst is lower than a predetermined first switching temperature;

control the average air-fuel ratio in the average air-fuel ratio control when the temperature of the exhaust purification catalyst is lower than a predetermined second switching temperature, so that a lean shift amount of a difference between the average air-fuel ratio and stoichiometric air-fuel ratio when controlling the average air-fuel ratio to a lean air-fuel ratio becomes smaller than a rich shift amount of a difference between the average air-fuel ratio and stoichiometric air-fuel ratio when controlling the average air-fuel ratio to a rich air-fuel ratio; and control the average air-fuel ratio in the average air-fuel ratio control when the temperature of the exhaust purification catalyst is the second switching temperature or more, so that the lean shift amount becomes larger than the rich shift amount.

2. The exhaust purification system of the internal combustion engine according to claim 1, wherein the control device is further configured to perform the inter-cylinder air-fuel ratio control including when the temperature of the exhaust purification catalyst is the first switching temperature or more.

3. The exhaust purification system of the internal combustion engine according to claim 1, wherein the control device is further configured to control the combustion air-fuel ratios of the cylinders without performing the inter-cylinder air-fuel ratio control when the temperature of the exhaust purification catalyst is higher than a predetermined upper limit temperature, so that the combustion air-fuel ratios become equal at all of the cylinders, and wherein the upper limit temperature being made a temperature higher than the first switching temperature.

4. The exhaust purification system of the internal combustion engine according to claim 1, wherein the control device is further configured to control the combustion air-fuel ratios of the cylinders without performing the inter-cylinder air-fuel ratio control when the temperature of the exhaust purification catalyst is the first switching temperature or more, so that the combustion air-fuel ratios become equal at all of the cylinders.

5. The exhaust purification system of the internal combustion engine according to claim 1, wherein the control device is further configured to control the combustion air-fuel ratios of the cylinders in the inter-cylinder air-fuel ratio control including when the average air-fuel ratio is controlled to the rich air-fuel ratio by the average air-fuel ratio control, so that the combustion air-fuel ratio becomes the lean air-fuel ratio at least at one cylinder among the plurality of cylinders.

6. The exhaust purification system of the internal combustion engine according to claim 1, wherein the control device is further configured to control the combustion air-fuel ratios of the cylinders without performing the inter-cylinder air-fuel ratio control when the average air-fuel ratio is controlled to the rich air-fuel ratio, so that the combustion air-fuel ratios become the rich air-fuel ratio at all of the plurality of cylinders.

7. The exhaust purification system of the internal combustion engine according to claim 1, wherein the control device is further configured to:

switch the average air-fuel ratio to a lean air-fuel ratio in the average air-fuel ratio control when controlling the average air-fuel ratio to a rich air-fuel ratio and an output air-fuel ratio of the downstream side air-fuel ratio sensor becomes a rich judged air-fuel ratio which is richer than the stoichiometric air-fuel ratio or becomes less; and switch the average air-fuel ratio to a rich air-fuel ratio in the average air-fuel ratio control when controlling the average air-fuel ratio to a lean air-fuel ratio and an output air-fuel ratio of the downstream side air-fuel ratio sensor becomes a lean judged air-fuel ratio which is leaner than the stoichiometric air-fuel ratio or becomes more.

8. The exhaust purification system of the internal combustion engine according to claim 1, wherein the control device is further configured to:

switch the air-fuel ratio to a lean air-fuel ratio in the average air-fuel ratio control when controlling the average air-fuel ratio to a rich air-fuel ratio and an output air-fuel ratio of the downstream side air-fuel ratio sensor becomes a rich judged air-fuel ratio which is richer than the stoichiometric air-fuel ratio or becomes less; and switch the average air-fuel ratio to a rich air-fuel ratio in the average air-fuel ratio control when the oxygen storage amount of the exhaust purification catalyst from when starting to control the average air-fuel ratio to a lean air-fuel ratio reaches a predetermined the switching reference storage amount which is less than the maximum storable oxygen amount of the exhaust purification catalyst.

* * * * *